(12) United States Patent
Shirakura

(10) Patent No.: US 10,592,708 B2
(45) Date of Patent: Mar. 17, 2020

(54) IMAGE RECOGNITION SYSTEM, IMAGE RECOGNITION METHOD, HOLOGRAM RECORDING MEDIUM, HOLOGRAM PLAYBACK DEVICE, AND IMAGE CAPTURE DEVICE

(71) Applicant: ARTIENCE LAB INC., Mobara-shi Chiba (JP)

(72) Inventor: Akira Shirakura, Mobara (JP)

(73) Assignee: ARTIENCE LAB INC., Mobara-shi, Chiba (JP)

( * ) Notice: Subject to any disclaimer, the term of this patent is extended or adjusted under 35 U.S.C. 154(b) by 8 days.

(21) Appl. No.: 15/565,186

(22) PCT Filed: Apr. 7, 2016

(86) PCT No.: PCT/JP2016/061377
§ 371 (c)(1),
(2) Date: Oct. 9, 2017

(87) PCT Pub. No.: WO2016/167173
PCT Pub. Date: Oct. 20, 2016

(65) Prior Publication Data
US 2018/0144160 A1 May 24, 2018

(30) Foreign Application Priority Data

Apr. 11, 2015 (JP) .................. 2015-081309

(51) Int. Cl.
*G06K 7/10* (2006.01)
*B42D 25/328* (2014.01)
(Continued)

(52) U.S. Cl.
CPC ............. *G06K 7/10* (2013.01); *B42D 25/328* (2014.10); *G03H 1/0005* (2013.01);
(Continued)

(58) Field of Classification Search
CPC ...... G06K 7/10; G06K 7/10732; G06K 19/16; G06K 7/1404; G06K 9/58;
(Continued)

(56) References Cited

U.S. PATENT DOCUMENTS 6,674,556 B1 * 1/2004 Mori ................... G03H 1/22
359/15
2006/0250925 A1 11/2006 Teraoka et al.
(Continued)

FOREIGN PATENT DOCUMENTS

JP 1999-258970 A 9/1999
JP 2001-176116 A 6/2001
(Continued)

*Primary Examiner* — Sonji N Johnson
(74) *Attorney, Agent, or Firm* — W&C IP

(57) ABSTRACT

[Problem to be Solved]
Conventional devices for reproduction of holograms for appreciative viewing do not have any functionality to gate access to special content by exploiting the characteristics of the hologram. Further, a system that allows users to easily perform judgment of authenticity has been much awaited as, with holograms, although a counterfeit prevention effect can be expected visually, counterfeit imitations of the holograms themselves are already in circulation.

[Means to Resolve the Problem]
It is made possible to read holographic barcodes with such portable information consoles as smartphones to perform judgment of authenticity. In this process, by controlling from the portable information console side the light sources illuminating the hologram, it is possible to add a strong authenticity judgment function without a major increase in cost and also without building any special infrastructure.

16 Claims, 20 Drawing Sheets

(51) Int. Cl.
*G03H 1/00* (2006.01)
*G03H 1/26* (2006.01)
*G06K 7/14* (2006.01)
*G06K 9/20* (2006.01)
*G06K 19/16* (2006.01)
*G03H 1/22* (2006.01)
*G06K 9/00* (2006.01)
*G06K 9/58* (2006.01)
*G06K 9/36* (2006.01)

(52) U.S. Cl.
CPC ............ *G03H 1/0011* (2013.01); *G03H 1/22* (2013.01); *G03H 1/2286* (2013.01); *G03H 1/268* (2013.01); *G06K 7/10732* (2013.01); *G06K 7/1404* (2013.01); *G06K 9/00979* (2013.01); *G06K 9/20* (2013.01); *G06K 9/2036* (2013.01); *G06K 9/58* (2013.01); *G06K 19/16* (2013.01); *G03H 2001/2244* (2013.01); *G03H 2001/2247* (2013.01); *G03H 2001/2292* (2013.01); *G06K 2009/0059* (2013.01); *G06K 2009/363* (2013.01)

(58) Field of Classification Search
CPC ....... G06K 2009/0059; G06K 9/00979; G06K 9/2036; G06K 9/20; G06K 2009/363; G03H 1/268; G03H 1/0011; G03H 1/2286; G03H 1/0005; G03H 1/22; G03H 2001/2244; G03H 2001/2247; G03H 2001/2292; B42D 25/328
See application file for complete search history.

(56) References Cited

U.S. PATENT DOCUMENTS

2010/0265554 A1\* 10/2010 Shirakura ................ G03H 1/04
359/32
2015/0205261 A1\* 7/2015 Kawauchi ............. G03H 1/265
359/3

FOREIGN PATENT DOCUMENTS

| | | |
|---|---|---|
| JP | 2001-337588 A | 12/2001 |
| JP | 2006-292989 A | 10/2006 |
| JP | 2008-122670 A | 5/2008 |
| JP | 2008-145991 A | 6/2008 |
| JP | 2010-250191 A | 11/2010 |
| JP | 2012-145612 A | 8/2012 |
| JP | 2014-146022 A | 8/2014 |
| JP | 2015-043317 A | 3/2015 |
| WO | 2014/027644 A1 | 8/2013 |

\* cited by examiner

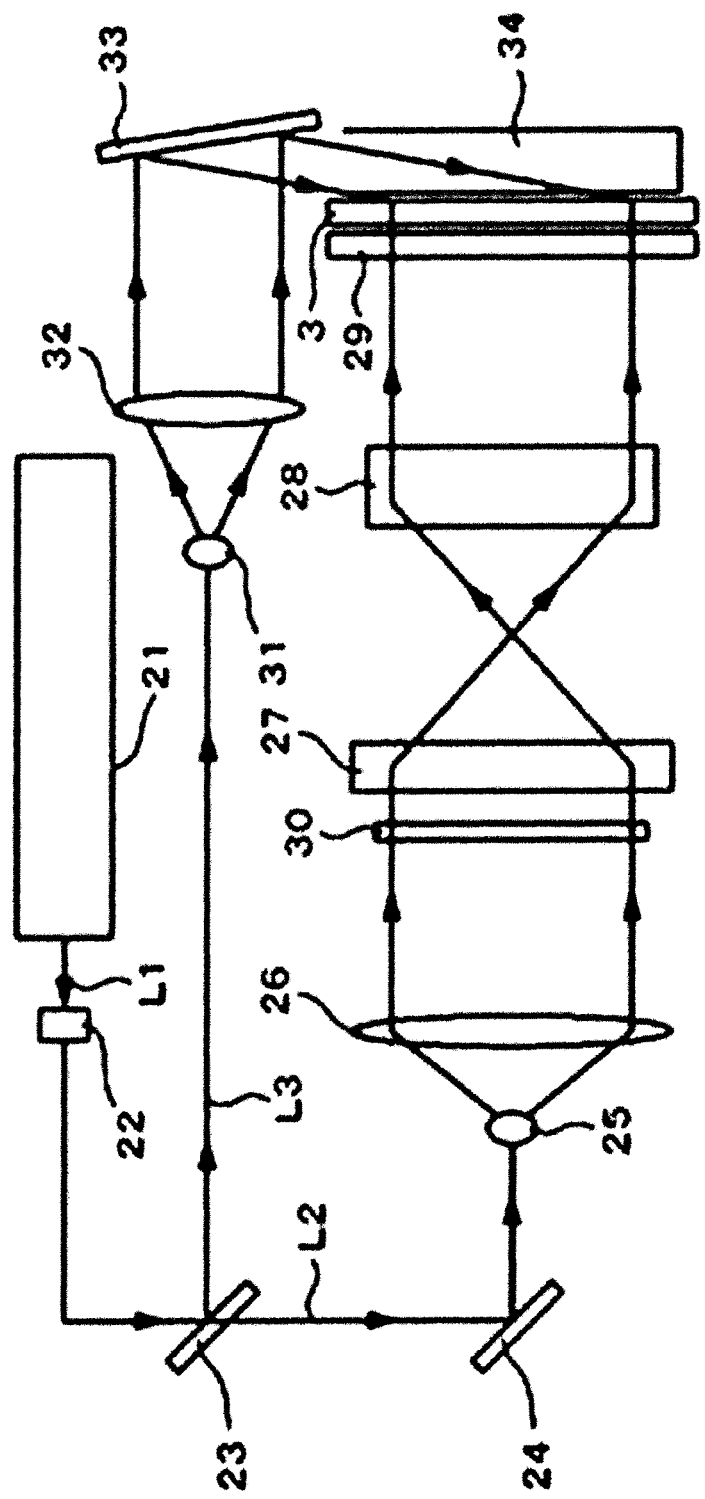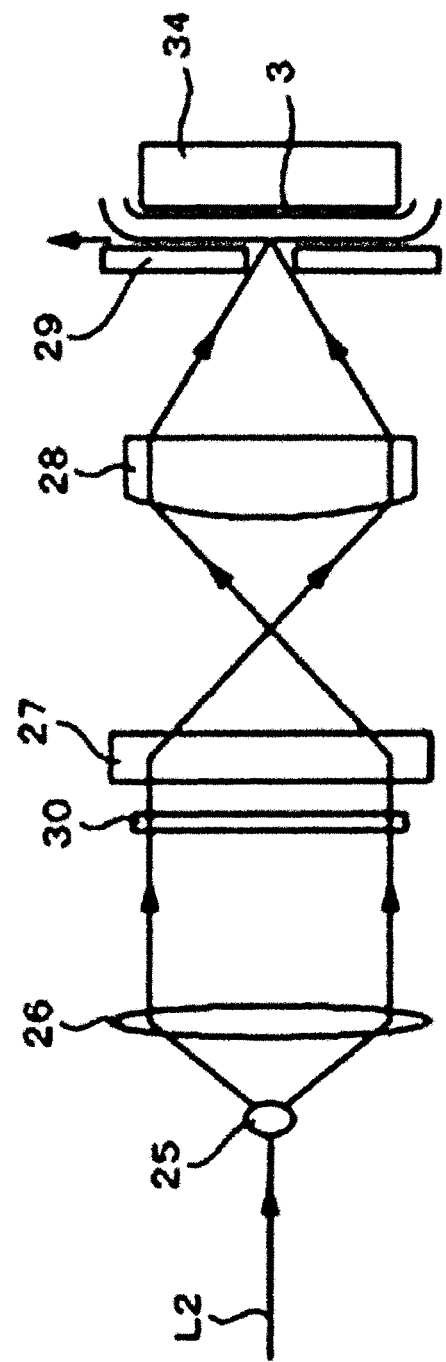
FIG.4

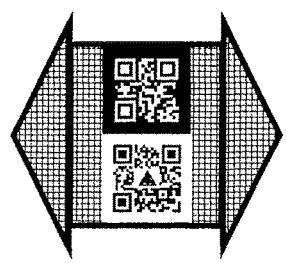
(A)
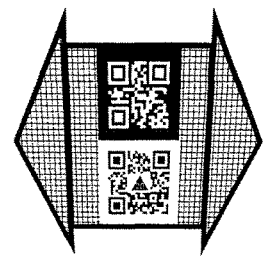
(B)
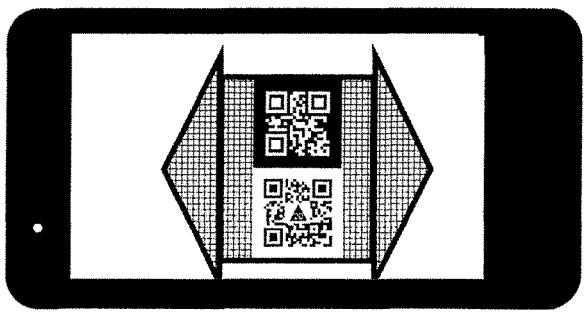
(C)
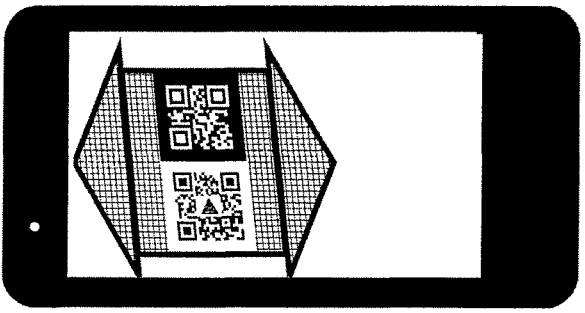
(D)
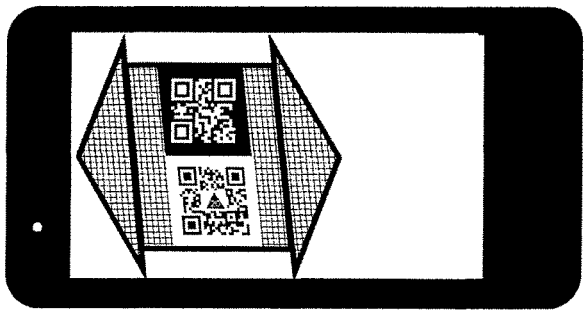
(E)
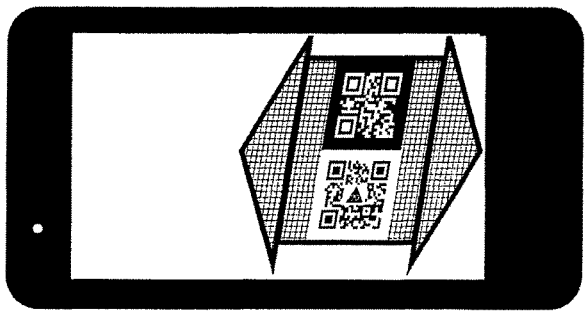
(F)
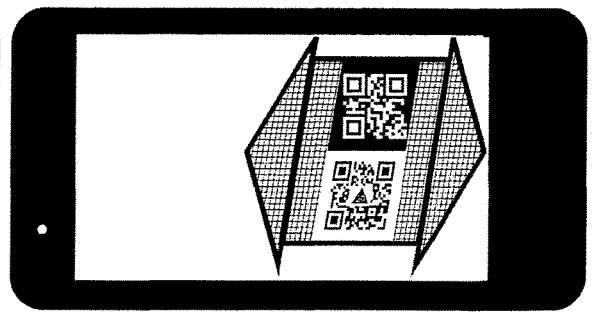
(G)
FIG.12

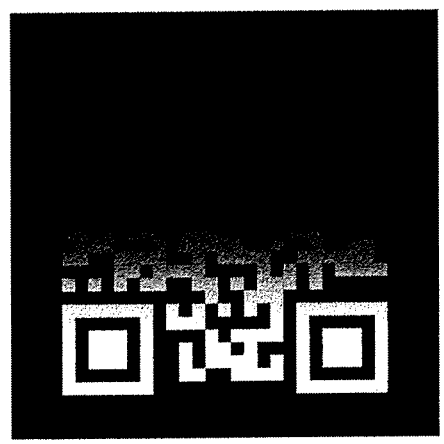
(a)
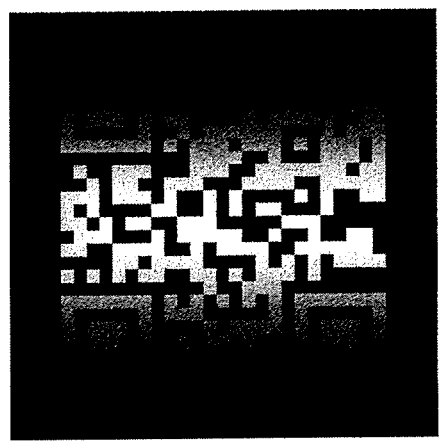
(b)
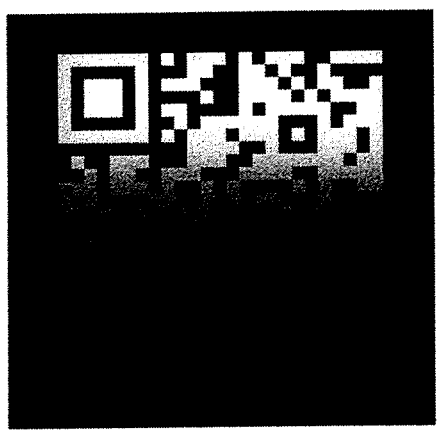
(c)
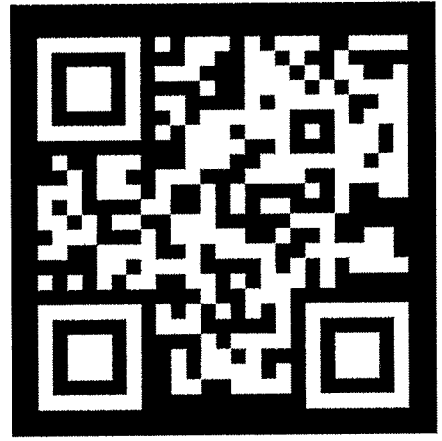
(d)
FIG. 14

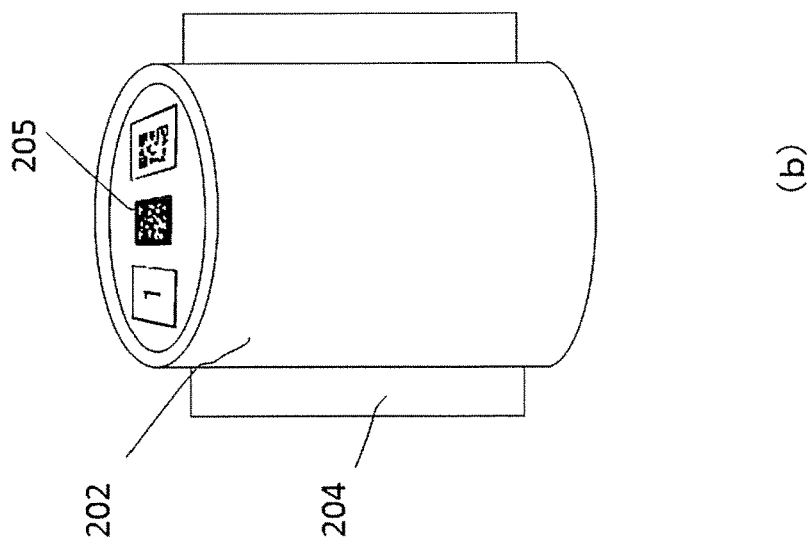
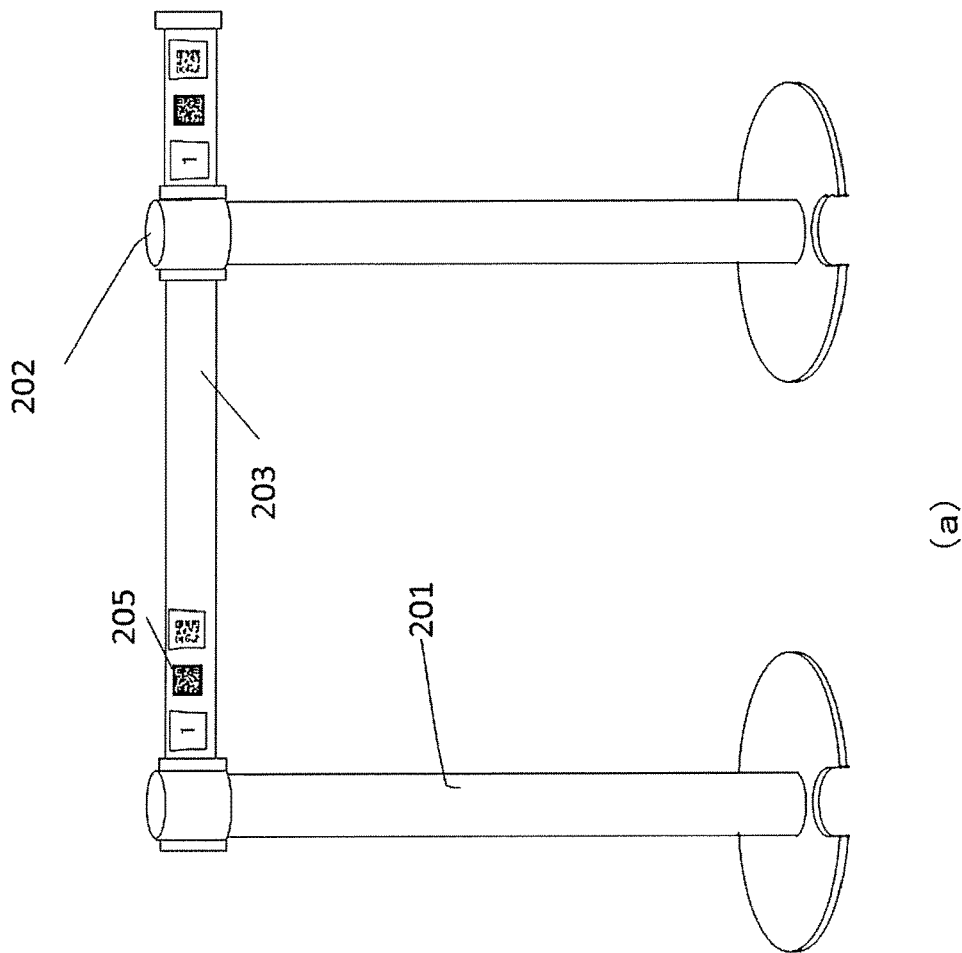
FIG.20

IMAGE RECOGNITION SYSTEM, IMAGE RECOGNITION METHOD, HOLOGRAM RECORDING MEDIUM, HOLOGRAM PLAYBACK DEVICE, AND IMAGE CAPTURE DEVICE

FIELD OF THE INVENTION

The present invention relates to an image recognition system, an image recognition method, a hologram recording medium, a hologram reproduction device and an image capture device. In particular, it relates to technology which enables access to special content that cannot be accessed unless a hologram is owned, by using a hologram viewing device to read data that is embedded in the hologram.

DESCRIPTION OF THE RELATED ART

Reproduction of a three-dimensional image (holographic image) is made possible with a hologram by its illumination by reproducing light. Whereas in some cases coherent light such as laser light is required, in the case of reproducing a hologram such as a rainbow hologram or a Lippmann hologram, incoherent white light such as a halogen lamp or natural light can be used.

As such holograms that allow the use of white light sources as reproducing light, holograms with the ability to reproduce three-dimensional images have been widely utilized for purposes such as prevention of forgery of credit cards. However, with the property of variable resolution and color which depend on the illuminating light source, they have not achieved a level to allow simple judgment of their authenticity by any person, although they do provide by their holographic appearance some deterrent effect against counterfeiting.

When a hologram is illuminated by reproducing light, the optical wavefronts of the light from the recorded object upon recording are reproduced, and these wavefronts become viewed as a holographic image by the viewer.

What is referred to as the holographic stereogram is a kind of hologram. A holographic stereogram is produced, for example, by using as original images a large number of images obtained by capturing images of the subject sequentially from different viewpoints, and recording consecutive exposures of element holograms in the form of strips or dots on a single sheet of hologram recording medium.

For example, as shown in FIG. 5, a holographic stereogram that has parallax information only in the horizontal direction is produced by sequentially displaying on the display of a holographic stereogram printing system incorporating a prescribed optical system a plurality of original images 101*a*-101*e* that are obtained by sequential image capture of the subject 100 from different horizontal viewpoints, and illuminating the displayed images with laser light to carry out consecutive exposures to record on a hologram recording medium 102, as element holograms, the interference fringes generated by interference between the object light that is modulated as an image and the reference light.

Because the image information obtained by successive capture of images from different horizontal viewpoints are consecutively recorded in the horizontal direction as bands of element holograms, the collection of image information recorded as a part of each element hologram is perceived as a two-dimensional image when seen by the viewer with one eye from a particular position, and the collection of image information recorded as a different part of each element hologram is perceived as a different two-dimensional image when seen by one eye from a different position. Therefore, when the viewer sees a holographic stereogram with both eyes the exposed image record is perceived as a three-dimensional image due to the parallax between the left and right eyes.

Various hologram display devices are being made use of, for example, as devices for displaying hologram images for appreciative viewing. In [Patent Document 1], an illumination device is disclosed that is suitable for viewing image holograms or holographic stereograms intended for appreciative viewing. That is, as shown in FIG. 6 and FIG. 7, it is possible make a three-dimensional image appear to move also to a viewer staying still, by consecutive lighting of plural light sources from specified positions relative to the hologram.

A hologram display device 1000 with an embedded audio player mechanism disclosed in [Patent Document 1] is shown in FIG. 7. Having the form of a box, when the lid is opened, the hologram 1002 attached to the back of the lid component 1001 is illuminated, from below at a specified angle by an LED that is internally mounted inside the main structure 1003. Components such as an audio data storage device, an audio data amplifier circuit, a speaker 1004, a batteries 1006, an LEDs and an electronic circuit board 1007 are internally mounted in the main structure. A micro-switch 1005 is placed in an inconspicuous position inside the main structure so that, with the lid closed, the switch is in a state of being pressed, and the power is in a so-called off condition. When the lid is opened, the switch moves to the open state, turning on the power. The lid 1001 is held at a specified angle γ such as, for example, 115°, by a stopper that is not shown in the figure. A plurality of LEDs such as, for example, seven, are preset at different positions, and it is possible to make the hologram image appear to move to a viewer staying still by lighting them in sequence. The relative positions of the LEDs and the hologram are such that the middle LED, L4 is placed at an angle α, for example 58°, from the normal to the approximate center of the hologram, and L1~L3, L5~L7 are placed in the plane containing the line connecting the center of the hologram and the middle LED, L4, in its vicinity and pointing to the center of the hologram from different angles.

It is disclosed, as an example of the mode of control after turning on the power, that by lighting in the sequence L1, L2, L3, L4, L5, L6, L7, the frames of the prerecorded hologram images would be reproduced in the sequence L1~L7 in FIG. 8 to the eyes of a person viewing from approximately the direction normal to the center, and further that, in the case that the function to play the stored audio data exists, the speed of the control of the lighting would be synchronized to the speed of the audio playback.

However, there was no function to enable external control of these light sources, and it was difficult, in the first place, to make it link with audio data in the case that there is no audio data information in the illuminating device.

In recent years, although smartphones, portable music players and portable game consoles with internet connectivity are in wide use, there are no such units that can, upon downloading music or voice messages relevant to the content of the hologram medium, have the hologram image move by lighting LEDs illuminating the hologram in synchronization with their playback.

With regard to such holograms for appreciative viewing, blocking access by the owner of the hologram to special content related to its subject offers a high utility value. For example, making it possible only by the owner of the hologram medium to have access to content related to the subject of the hologram, such as special voice messages of popular personalities and mascot characters or short bonus music tracks, the value of the hologram is greatly enhanced.

On the other hand, services in wide use that utilize individual authentication codes may be noted. Prepaid cards such as music cards, international telephone cards, iTunes and Google Play cards (both are trade names) are validated by scratching to remove the protective layer on the card to then read the printed PIN code for input. On medals with animation characters such as Yo-kai Watch (registered trademark), in addition to a variety of characters that are printed on the medal, it is possible to have access to special content by reading and registering printed barcodes on the back side that enable individual identification. On beverage packages with individual identification barcodes and numerical codes that appear when a sticker is peeled that is not repeatedly removable, they are utilized also in marketing by their use in a way to allow entry for an offered prize.

However, such numerical codes and barcodes become separated from the cards and merchandise to which they are attached, and the value of the media themselves on which the IDs are described become lost or diminished. In addition, there is the inconvenience of the need to enter a large number of characters, as well as frequent troubles due mistakes in entry although they are encrypted.

There are cases of the use for authentication of such media as IC cards of the contact type and the non-contact type, of RF tags and of flash memory as well, but their wide use is limited due not only to the high cost of the media, but also to the expensive dedicated devices that are required for reading them.

On the other hand, a variety of methods of utilizing holograms for authentication have been disclosed. In Patent Document 2, although a hologram is disclosed which, as a switchable image, appears as different three-dimensional images depending on the viewing direction, it is not an image for the purpose of authentication. In Patent Document 3, although a holographic recording film with appended data is disclosed, it is neither with limited viewing angle nor in the form such as of a barcode to be read by a machine. In Patent Document 4, a medium is disclosed that allows information such as numbers for control to be visible only from a limited range of angles for the purpose of facilitating the management of the printing process of holographic stereograms, but neither is the information for judgment of authenticity, nor is the information in a form to be read by a machine. In Patent Document 5, a type of medium that allows individual ID information to be viewed as a hologram from a limited range of angles is disclosed. However, it is difficult for a person without a basic knowledge to quickly perform its reading with a machine since a hologram cannot be viewed unless not only the position during capture but also the angle of the illuminating light is specified. In order to provide a solution to this point, an implementation is disclosed in Patent Document 6 in which an optical guide is displayed by the capturing device when the hologram with a narrow angular range of reproduction is read, so that the position during capture can be restricted. However, there is still a special skill that is required for capture, as well as a problem of high cost due to the need for an additional device in the reading equipment. An implementation is disclosed in Patent Document 7 in which partially captured images are synthesized by time-sequential illumination by a plurality of LED light sources placed in the vicinity of the hologram, in order to read character information recorded in the hologram during the inspection procedure of its production. However, this conventional implementation is a technique for the purpose of enabling the reading of a hologram recorded in the back or front of the face of the hologram medium when illuminated by light sources in the vicinity so that, although it is effective for removal of cross-talk, that is, the reproduction of so-called multiple images when simultaneously illuminated by different light sources, it is not directly applicable when the barcode is printed on the face of the hologram medium since multiple images are not reproduced and no cross-talk occurs, and a different element that cannot easily be reverse engineered needed to be added for the case of utilization for the purpose of strengthening the authentication function.

PRIOR ART DOCUMENTS

[Patent Documents]

[Patent Document 1] Japanese Unexamined Patent Application Publication No. 2014-146022 "ILLUMINATION APPARATUS, AND IMAGE RECORDING MEDIUM"

[Patent Document 2] Japanese Unexamined Patent Application Publication No. 2008-122670 "FABRICATION PROCESS OF MULTI-IMAGE TYPE HOLOGRAM AND MULTI-IMAGE TYPE HOLOGRAM FABRICATED BY THAT PROCESS"

[Patent Document 3] Japanese Unexamined Patent Application Publication No. H11-258970 "HOLOGRAM RECORDING FILM WITH ADDITIONAL INFORMATION AND ITS RECORDING METHOD"

[Patent Document 4] Japanese Unexamined Patent Application Publication No. 2001-337588 "HOLOGRAM PRINT SYSTEM AND HOLOGRAPHIC STEREOGRAM"

[Patent Document 5] Japanese Unexamined Patent Application Publication No. 2010-176116 "IMAGE RECORDING MEDIUM, HOLOGRAM REPLICATING DEVICE AND HOLOGRAM REPLICATING METHOD"

[Patent Document 6] Japanese Unexamined Patent Application Publication No. 2012-145612 "OPTICAL READING MODULE AND OPTICAL READER"

[Patent Document 7] Japanese Unexamined Patent Application Publication No. 2010-250191 "HOLOGRAM REPRODUCING AND IMAGING APPARATUS, AND HOLOGRAM REPRODUCING AND IMAGING METHOD"

SUMMARY OF THE INVENTION

Problem to be Solved by the Invention

By using a hologram medium in which a barcode is recorded as overlay that is machine-readable when illuminated by a specified wavelength from a specified angle, the present invention makes possible simple reading of the barcode information on the medium by a portable information console such as a smartphone, a portable game console or a portable music player. Since a hologram cannot be easily counterfeited, this enables its utilization as a key without which access is denied unless the hologram medium is owned. As many portable information consoles have means to connect to the capturing device and to the internet, it is possible, just with additional software, to add a variety of functions without major additional cost.

It is, however, to be noted that since quick and accurate reading of the barcode is difficult by simple capture of the hologram by the portable information console, it is important to make it possible to easily read the hologram just by holding the console to directly face the hologram, without any special knowledge about holograms.

Furthermore, should a person attempt to gain access with malicious intent using counterfeited data, in case the information written in the authentic hologram becomes revealed, the system for judgment of authenticity becomes vulnerable if data are returned as if there is an authentic hologram by capturing the information by displaying it on a two-dimensional printed hardcopy or display. Therefore, it is important to prevent decoding of the algorithm and parameters for judgment of authenticity by reverse engineering, and to put in place a double and triple system for avoidance of the return of authentic data to the system for judgment of authenticity, even in the case that they should happen to be decoded.

Means to Resolve the Problem

The present inventors have found the following means to resolve the problems of the conventional art which has been described in the foregoing. That is, a barcode that can be captured and decoded from the direction directly facing the hologram only when the illuminating light is incident from a specified direction and with a specified wavelength is recorded in a part of the hologram for appreciative viewing, and a high-order judgment of authenticity is performed by varying such conditions as the relative positions of the hologram, the illuminating light source and the image sensor and analyzing the reproduced images that are obtained according to such changes.

For example, an algorithm was found that is able to perform judgment of authenticity through whether or not image information corresponding to the illumination can be captured by a smartphone, by mounting a medium incorporating a hologram in an illuminating device and by controlling the illumination inside the illumination device from the smartphone. The image information is preferably such information as two-dimensional barcodes that allow clear judgment of legibility.

In addition, by judging the captured images with such illumination in real time, should a person attempt judgment of authenticity using two-dimensional printed material or lenticular-type printed material that are not holograms, rejection as counterfeit is possible since the variation of the image according to the illumination is absent. In particular, the capturing device performs decoding at regular intervals, so that the presence of an actual hologram can be judged by determining in real time whether or not decoding is possible when switching the illuminating light sources. Even if the authentic barcode is printed as hardcopy, the captured image would not follow the changes by illumination from various directions.

The authenticity judgment function can be strengthened further by an arrangement to read a plurality of barcodes by sequential control of a plurality of light sources.

Furthermore, should a person go so far as to sense the illuminating light and, with this timing, use a display monitor to display the image corresponding the hologram image, it is difficult to produce the same image as the authentic hologram without a capability of three-dimensional sensing, whereas the hologram has the function of exactly reproducing the direction from which the illuminating light is incident. Even if it can be produced, a substantial interval of time is required to produce the corresponding image and display it on the monitor after sensing. Therefore, there is a great significance in judging whether or not the captured image follows the rapid switching of the illuminating light.

In addition, a method of adding an authenticity judgment function of high degree is invented, in the form of capture of the holographic barcode in blocks and its decoding after reconstruction. By using this method, real-time image analysis in a short time is made impossible unless the parameters of the image processing are known.

Information such as the algorithm and parameters of authenticity judgment and the timings of illumination control may be stored in the capturing device or the illumination device, but for higher security it is also possible to have this information provided from a remote sever and have them changed by discretion.

As it is difficult to capture, with such handheld consoles as smartphones, a barcode that is holographically recorded so that it can be read only from a limited range of positions, quick and easy capture is made possible by performing focusing with two-dimensionally printed markings and by limiting the zone in which the barcode is expected to be printed.

Further, if an attempt is made to decode a barcode but fails, it is made easier to decode without any movement required on the side of the image sensor, by repeated decoding with slightly different positions of the light source.

An algorithm is further invented that enables decoding, rather than in combination with an illuminating apparatus, with just the portable information console, such as a smartphone, itself which has, for capturing, an image sensor and a light source.

The present invention is a method of performing image recognition using an information processing device with an image sensor, together with a hologram, and resolves the said problem by providing a method of creating an image that comprises a procedure for creating at least two different conditions with different relative positions of the hologram medium, the light source and image sensor, or different conditions of the light source, and a procedure for the said information processing device to acquire the image information in the said different conditions.

The present invention further resolves the said problem, in the said image recognition method, by providing an image recognition method described in Paragraph 32 characterized by comprising a procedure for determining the authenticity of a hologram by comparing the information acquired by the procedure described in the foregoing and the information recorded in the hologram which is the medium that is the subject of recognition.

The present invention further resolves the said problem, in the said image recognition method, by providing an image recognition method described in Paragraph 32 characterized by comprising a procedure for transferring the information acquired by the procedure described in the foregoing to another device, a procedure for acquiring the result of comparing it with the information recorded in the hologram which is the medium that is the subject of recognition, and a procedure for executing different actions depending on the said result.

The present invention further resolves the said problem, in the said image recognition method, by providing an image recognition method described in Paragraph 32 characterized by, in addition, comprising a procedure for reading non-holographic information placed in the vicinity of the said hologram.

The present invention further resolves the said problem, in the said image recognition method, by providing an image recognition method described in Paragraph 32 characterized by, in addition, comprising a procedure for storing, together with the said image information, individual ID information that is assigned to the information processing device comprising an image sensor.

The present invention further resolves the said problem, in the said image recognition method, by providing an image recognition method described in Paragraph 32 characterized by comprising a procedure in which the hologram reproduction device with a light source holds the hologram medium in such a way that the relative positions of the light source and the hologram medium described in the foregoing is specified, a procedure for the said information processing device which is separable from the said hologram reproduction device to, in a more or less still condition, control the light source in the said hologram reproduction device and a procedure for performing determination of authenticity of the said hologram medium by analyzing or decoding at least two images captured by the image sensor placed in the said information processing device.

The present invention further resolves the said problem, in the said image recognition method, by providing an image recognition method described in Paragraph 32 characterized by comprising a procedure for the said information processing device to control the lighting by at least two light sources placed in the hologram reproduction device, and a procedure for determining the authenticity by analyzing the object variation of the captured image in accordance with the control of the lighting.

The present invention further resolves the said problem, in the said image recognition method, by providing an image recognition method described in Paragraph 32 characterized by comprising a procedure for the information processing device, using a hologram medium in which at least one image code for authentication is holographically printed, to cause the sensing state to occur at a specified sampling interval with respect to the hologram medium, in which at least one image code for authentication is printed, and a procedure for executing determination of authenticity by noting at least one among the ability to decode when illuminated by a specified light source, the inability to decode unless illuminated by a specified light source, and the inability to decode when illuminated by a plurality of light sources.

The present invention further resolves the said problem, in the said image recognition method, by providing an image recognition method described in Paragraph 32 characterized by comprising, using a hologram medium in which holograms are printed so that at least two different image codes for authentication are reproduced by different modes of illumination, a procedure for causing the sensing state to occur with a capturing device that is more or less still with the focus fixed, a procedure for sending commands for illumination by different light sources, and a procedure for using the ability to read image code information for authentication in accordance with such illumination for determination of authenticity.

The present invention further resolves the said problem, in the said image recognition method, by providing an image recognition method described in Paragraph 32 characterized by comprising, using a medium in which encrypted image codes for authentication are recorded holographically, a procedure for creating and capturing at least two different conditions of positional relationships among the illuminating light, the said medium and the image sensor, a procedure for re-creating a single image code for authentication by reconstruction of partial zones that are captured, and a procedure for decoding from the said reconstructed image code for authentication.

The present invention further resolves the said problem, in the said image recognition method, being an information processing device with an image sensor that is a portable information console having a light source, by providing an image recognition method described in Paragraph 32 characterized by comprising a procedure for controlling the light source, a procedure for capturing a plurality of images in different conditions by moving the entire portable information console with respect to the hologram medium, and a procedure to execute determination of authenticity of the said hologram medium by analyzing or decoding the captured image.

The present invention further resolves the said problem, in the said image recognition method, by providing an image recognition method described in Paragraph 32 characterized by, in using the image recognition method described in the foregoing, being an information processing device with an image sensor that is a portable information console having a light source, comprising a procedure for acquiring the detected value of at least one among acceleration sensors and gyrosensors incorporated in the portable information console, and a procedure for utilizing for image analysis the detected value that is acquired.

The present invention further resolves the said problem, in the said image recognition method, by providing an image recognition method described in Paragraph 32 characterized by, in using the image recognition method described in the foregoing, being an information processing device with an image sensor with a means of communicating with a remote authentication server and comprising a procedure for transmitting to and receiving from the server information regarding the lighting control of the hologram reproduction apparatus and information such as the captured images, the content of data that has been decoded and the time required for decoding.

The present invention further resolves the said problem, in the said image recognition method, by providing an image recognition method described in Paragraph 32 characterized by comprising a procedure for reading a marking image displayed on the hologram medium, on the face of the hologram or in its vicinity on the base material by printing or working by a non-holographic method, a procedure for predicting the position of the hologram medium from the information acquired from the said marking image, and a procedure for capturing or decoding the hologram image by restricting the zone from the said predicted information.

The present invention further resolves the said problem, in the said image recognition method, by providing an image recognition method described in Paragraph 32 characterized by a barcode constituting the marking printed by two-dimensional printing, and comprising a procedure for an information processing apparatus to decode the barcode, a procedure for fixing the focus upon completion of decoding and a procedure to then capture the hologram image.

The present invention further resolves the said problem, in the said image recognition method, by providing an image recognition method described in Paragraph 32 characterized by, in an information processing device incorporating an image sensor, a light source and a display device, comprising a procedure for displaying the image captured by the image sensor in real time, a procedure for sequentially lighting the light source, a procedure for displaying a first guiding mark on the display device, a procedure to prompt alignment of the guiding mark on the display device with a first marking image displayed on the hologram medium, on the face of the hologram or in its vicinity on the base material by printing or working by a non-holographic method, a procedure for displaying a second guiding mark on the display device after the first hologram information has been read, and a procedure to prompt its alignment with a second marking image on the face of the hologram or in the vicinity on the base material.

The present invention further resolves the said problem, in the said image recognition method, by providing an image recognition method described in Paragraph 47 characterized by, in an information processing device incorporating an image sensor, a light source and a display device, comprising a procedure for transmitting data about the model type of the information processing device to a storage device, a procedure for acquiring from the said storage device data about the position of the guiding mark to be displayed on the display device, and a procedure for displaying on the display device according to the acquired data.

The present invention further resolves the said problem, in the said image recognition method, by providing an image recognition method described in Paragraph 47 characterized by comprising a procedure for transmitting to the said storage device the image of the holographic barcode on the image sensor upon successful decoding of the holographic barcode, or information of parameters acquired from the image such as position and angle.

The present invention further resolves the said problem, in the said image recognition method, by providing a medium characterized by, in a medium in which an image code for authentication is holographically recorded, the recording being made in such a way that, when the same position on the face of the said medium is illuminated from different angles, at least two independent image codes for authentication, or partial image codes for authentication, are reproduced.

The present invention further resolves the said problem, in the said image recognition method, by providing a medium characterized by, in a medium in which an image code for authentication is holographically recorded, the recording being made in such a way that, when the same position on the face of the said medium is illuminated by light of different wavelengths, at least two independent image codes for authentication, or partial image codes for authentication are reproduced.

The present invention further resolves the said problem, in the said image recognition method, by providing a medium in which image codes for authentication in Paragraph 0050 or Paragraph 0051 are pre-recorded in such a way that they cannot be decoded with illuminating light of a single type from a single direction.

The present invention further resolves the said problem by providing a medium described in Paragraph 0050 or Paragraph 0051 characterized by having a marking image displayed on the hologram medium, on the face of the hologram or in its vicinity on the base material by printing or working by a non-holographic method.

The present invention further resolves the said problem by providing an image recording medium described in Paragraph 0053, characterized by, in the image recording medium described in the foregoing, the said marking image being an image code for authentication.

The present invention further resolves the said problem by providing an image recording medium described in Paragraph 0054, characterized by, in the image recording medium described above, having symbols printed indicating the direction in which the image sensor and the medium should be moved relative to each other when reading the image code for authentication.

The present invention further resolves the said problem by providing an image recording medium described in Paragraph 0054, characterized by, in the image recording medium described in the foregoing, having at least one among the marking images and the image codes for holographic authentication printed with trapezoidal deformation.

The present invention further resolves the said problem by providing a medium described in Paragraph 0050 or Paragraph 0051, characterized by, in the image recording medium described in the foregoing, having a separate image for appreciative viewing formed on the same medium apart from the image code for holographic authentication.

The present invention further resolves the said problem by providing a medium described in Paragraph 0050 or Paragraph 0051, characterized by, in the image recording medium described in the foregoing, the said image recording medium being formed either as a part of a partition belt, its housing, and a partition stand that can be placed to stand on the floor on which the housing is set, or as a part of the said partition belt.

The present invention further resolves the said problem by providing an image reproduction device characterized by, in a hologram reproduction device, having a means of communication and either controlling the lighting of light sources according to external control signals or transmitting control signals to another device to control the lighting of light sources.

The present invention further resolves the said problem by providing an information reader device in which, in a device for reading media in which image codes for authentication are recorded holographically, optical apertures are formed as either or both an optical aperture for positioning the capturing lens and an optical aperture for positioning the holographic code section described in the foregoing.

The present invention further resolves the said problem by providing a medium described in Paragraph 0060, characterized by, in an information reader device described in the foregoing, having an internally mounted portable information console incorporating an image sensor and a light source, and an optical aperture for proximate positioning of a hologram medium.

The present invention further resolves the said problem by providing a medium described in Paragraph 0060, characterized by, in the information reader device described in the foregoing, having an optical aperture for proximate positioning of an internally mounted holographic barcode medium and the imaging lens of a portable information console.

The present invention further resolves the said problem by providing a medium described in Paragraph 0060, characterized by, in the information reader device described above, having a light source on the line, or on its optically extended line, that is approximately symmetric to the line joining the center of the holographic barcode medium and the aperture of the imaging lens, with respect to the normal to the holographic barcode medium.

Advantageous Effect of the Invention

The use of this invention enables the addition of authenticity judgment function to holograms for appreciative viewing. For example, it is possible to render added functionality such as allowing the download of such content as bonus music tracks and voice messages to a storage device incorporated in a smartphone or hologram reproduction device, or the acquisition of special character content, only if an actual hologram is present.

The advantage is that the said addition of function can be realized without elements of major increases in cost in such aspects as hardware, software, production process of the medium, and construction of infrastructure for reading.

In particular, in the case of reading the information of the hologram with stand-alone portable information terminals, there is great advantage in making it possible even for a person without good knowledge of the characteristics of holograms to read the information simply and clearly. This is of great utility since, if applied to such items as merchandise tags of brand-name goods and packages of medicinal supplies, the authenticity of the merchandise can be easily confirmed in the home.

Best Mode for Embodiment of the Invention

In the following, the embodiment of the present invention will be explained by reference to the figures. The present invention applies to systems, methods, media and devices that render added functionality to holograms or holographic stereogram media.

Then, in the following, before explaining the devices in which the present invention is applied, the holographic stereogram will be explained in concrete as an example of holograms and holographic stereograms that are to be mounted on such devices.

First, the principle of the light exposure to record an element hologram on a hologram recording medium is described.

The holographic recording medium 3 is composed as a film-coated recording medium, as shown in FIG. 1, by forming a photopolymer layer 5 that is the recording layer with a photopolymerizable photopolymer on a base film 4 that is a base material of, for example, polyethylene terephthalate (hereinafter referred to as PET) and attaching onto this photopolymer layer 5 a cover film 6 that is a base material of, for example, a PET film.

In such a hologram recording material 3, as shown in FIG. 2A, the photopolymerizable photopolymer constituting the photopolymer layer 5 is, in the initial state, in a uniformly dispersed condition in the matrix polymer. By irradiation with laser light LA with a power of 10 mJ/cm2 to 400 mJ/cm2, the photopolymerizable photopolymer in the exposed part is made to be, as shown in FIG. 2B, in a polymerized condition in which the monomers M that were uniformly dispersed in the matrix polymer have been polymerized.

As the polymerization of the photopolymerizable photopolymer proceeds, migration of the surrounding monomers M results in variation of their concentration which produces modulations of the refractive index between the exposed and unexposed parts. Then, as illustrated in FIG. 2C, polymerization of the monomers M in the matrix polymer is completed when the entire surface is irradiated with ultraviolet or visible light LB of about 1000 mJ/cm2.

In the hologram recording material 3, exposure and recording of the interference fringes produced by the interference between the reference light and the object light are made as variations in the refractive index by the changes produced in the refractive index of the photopolymerizable photopolymer constituting the photopolymer layer 5 according to the irradiation by laser light LA.

It is not necessary for the hologram recording medium 3 to be subject to a dedicated developing process after recording by exposure since it is formed as a film-coated recording medium. Accordingly, the need for the holographic stereogram printing system to have a construction for a developing process is obviated by the use of such hologram recording medium 3, which enables simplification of the configuration of the apparatus and rapid production of holographic stereograms.

In the following, a description is given of the holographic stereogram printing system used for the production of holographic stereograms using the hologram recording medium 3 described in the preceding paragraphs.

The following description is for the case of the production of a holographic stereogram with horizontal parallax information embedded by exposure and recording of a plurality of bands of element holograms on a single hologram recording medium 3. The holographic stereogram may, of course, as an example have both parallax information in both horizontal and vertical directions embedded by exposure and recording of a plurality of element holograms in the form of dots.

The holographic stereogram printing system 10, as shown in FIG. 3, exposes and records holographic stereogram images on a hologram recording medium 3 that is a photosensitive film. The holographic stereogram printing system 10 comprises an image data processing module 11 for processing the image data for exposure and recording, a control computer 12 for controlling the entire holographic stereogram printing system 10 and a holographic stereogram printing module 13 incorporating an optical system for producing a holographic stereogram.

The data processing module 11 comprises at least an image processing computer 14 and a storage device 15 and, for example, generates a parallax image data sequence D3 based on the captured image data D1 incorporating parallax information supplied from a parallax image sequence capturing device 1 by, for example, a multi-view camera or a translating camera, or on image data such as computed image data D2 that incorporates parallax information and that is generated by an image data generating computer 2.

The captured image data D1 are a set of a plurality of image data acquired by, for example, simultaneous capture with a multi-view camera or sequential capture with a translating camera, and parallax information is incorporated between individual image data that constitute the captured image data D1. The computed image data D2 are a set of a plurality of image data generated, for example, as CAD (Computer Aided Design) or CG (Computer Graphics) data, and parallax information is incorporated between individual image data that constitute the computed image data D2.

The image data processing module 11 performs prescribed image processing for the holographic stereogram with an image processing computer 14 on the parallax image data sequence D3 based on these captured image data D1 and/or computed image data D2 to generate the hologram image data D4. The hologram image data D4 is temporarily stored in, for example, a storage device 15 such as a memory or hard disk. As described in the following paragraphs, in the exposure and recording of element hologram images on the hologram recording medium 3, the image data of the element holograms are read out from the stored hologram image data D4 sequentially for individual image data at a time, and these element hologram image data D5 are supplied to the control computer 12.

The control computer 12 controls the holographic stereogram printing module 13 to sequentially expose and record element display images, based on the element hologram image data D5 supplied by the image data processing module, as bands of element holograms on the hologram recording medium 3 placed in a part of the holographic stereogram printing module 13. In this function, the control computer 12 controls the operation of each mechanism of the holographic stereogram printing module 13, as described in the following paragraphs.

In the structure of the holographic stereogram printing module 13, each component of the optical system is installed and supported on a supporting plate (optical table) that is not shown in the figure, and this supporting plate is supported by the main frame of the apparatus by means of such components as dampers that are not shown in the figure. The optical system of the holographic stereogram printing module 13 for holographic stereogram printing includes an incident optical system, an object optical system and a reference optical system. The holographic stereogram printing system 10 has a structure in which at least the optical system is shielded from light because of the use of the hologram recording medium 3 which is a photosensitive material.

As illustrated in FIG. 4A the holographic stereogram printing module 13 comprises an incident optical system with a laser light source 21 that emits laser light of a prescribed wavelength, a shutter mechanism 22 that is placed on the optical axis of the laser light L1 from this laser light source 21 and either passes to the next stage or blocks the laser light L1, and a half mirror 23 that splits the laser light L1 into the object light L2 and the reference light L3.

The laser light source 21 is composed of a laser device that emits laser light L1 of a single wavelength and good coherence, such as a semiconductor laser pumped YAG laser device, a water-cooled argon ion laser device or a water-cooled krypton laser device.

The shutter mechanism 22 is opened and closed by the control signal C1 output from the control computer 12 in alignment with the timing of the output of the element hologram image data D5 and introduces the laser light L1 into the optical system of the next stage. Or, it blocks the introduction of the laser light L1 into the optical system of the next stage.

A half mirror 23 splits the incident laser light L1 into the transmitted light and the reflected light. Whereas the transmitted part of the laser light L1 is used as the object light L2 which has been described, the reflected part is used as the reference light L3 These object light L2 and reference light L3 are each introduced into the object optical system or the reference optical system that constitute the next stage.

Such components as mirrors, although they are not shown in the figure, may be placed in the incident optical system for purposes such as of appropriately altering the directions of travel of the laser light L1 in order to match the optical path lengths of the object light L2 and the reference light L3. In addition, the shutter mechanism 22 may be, for example, constituted to drive a shutter blade mechanically or to be an electronic shutter using an acousto-optic modulator; AOM. That is, the shutter mechanism 22 may be any device that can be controlled to be open or closed to block or transmit the laser light L1.

As the object optical system, the holographic stereogram printing module 13 comprises, as shown in FIGS. 4A and 4B, optical components such as a mirror 24, a spatial filter 25, a collimating lens 26, a projection lens 27, a cylindrical lens 28 and a mask 29, with each of these optical components sequentially arranged along the optical axis from the input side.

The mirror 24 reflects the object light L2 transmitted through the half mirror 23. The object light L2 reflected by this mirror 24 is incident on the spatial filter 25.

The spatial filter 25 is formed, for example, by combining a convex lens with a pinhole, and isotropically expands the object light L2 reflected by the mirror 24 to match the width of the display surface of the transmissive liquid crystal display 30 to be described in the following.

The collimator lens 26 converts the object light L2 expanded by the spatial filter 25 into a parallel beam and guides it onto the transmissive liquid crystal display 30.

The projection lens 27 makes the object light L2 slightly divergent and projects it onto a cylindrical lens 28. By the slight diverging effect on the object light L2 this projection lens 27 contributes to the improvement of the image quality of the holographic stereogram produced.

The object light L2 that has been converted into a parallel beam is condensed in the horizontal direction by the cylindrical lens 28.

The mask 29 has a thin rectangular aperture and introduces onto the hologram recording medium 3 the part of the object light L2 condensed by the cylindrical lens 28 that passes through the aperture.

A transmissive liquid crystal display 30 is also installed in a position between the collimator lens 26 and the projection lens 27. Element hologram images are sequentially displayed on the transmissive liquid crystal display 30, based on the element hologram image data D5 supplied by the control computer 12. The control computer 12 supplies a driving signal C2 to the recording medium feed mechanism 34 of the hologram recording medium 3, to be described in the following, and controls the movement action of the hologram recording medium by controlling its action.

In such an object optical system the object light L2, which has the form of a narrow beam incident from the incident optical system after splitting, is expanded by the spatial filter 25 and converted into a parallel beam by being introduced to the collimator lens 26. Further, in the object optical system the object light L2 that is made incident onto the transmissive liquid crystal display 30 through the collimator lens 26 is modulated as an image according to the element hologram image displayed on the transmissive liquid crystal display 30, and introduced into the cylindrical lens 28 through the projection lens 27. Then, in the object optical system, the object light L2 that is modulated as an image is made incident onto the hologram recording medium 3 through the aperture of the mask 29 during the time in which the action of the shutter mechanism 22 is to be open, thereby making an exposure and recording in alignment with the element hologram image.

In addition, as the reference optical system, the holographic stereogram printing module 13 has a spatial filter 31, a collimating lens 32 and a mirror 33, with each of these optical components sequentially arranged along the optical axis from the input side.

The spatial filter 31 is formed in a different way from the spatial filter 25 in the object optical system described in a previous paragraph by, for example, combining a cylindrical lens with a slit, and unidimensionally expands the reference light L3 split by reflection by the mirror 23 to a prescribed width, specifically to match the width of the display surface of the transmissive liquid crystal display 30.

The collimator lens 32 converts the reference light L3 expanded by the spatial filter 31 into a parallel beam.

The mirror 33 reflects the reference light L3 and guides it to the rear of the hologram recording medium 3 from which it is made incident on the medium.

The holographic stereogram printing module 13 with such an optical system is constituted in such a way that, after being split by the half mirror 23 the optical path lengths of the object optical system through which the object light L2 travels and of the reference optical system through which the reference light L3 travels are nearly the same. Therefore, in the holographic stereogram printing module 13 better coherence is achieved, making it possible to produce a holographic stereogram with a clearer reproduced image.

The holographic stereogram printing system 10 is, in addition, equipped with a recording medium feed mechanism 34 which intermittently moves the hologram recording medium 3 by the dimension of one element hologram at a time in the direction indicated by the arrow in FIG. 4B.

The recording medium feed mechanism 34 intermittently drives the translational movement of the hologram recording medium 3 based on the driving signal C2 supplied by the control computer 12. And the holographic stereogram printing system 10, in linked action with this action of the recording medium feed mechanism, operates the shutter mechanism 22 described in a previous paragraph to open the optical path of the laser light L1 based on the control signal C1 supplied by the control computer 12.

In such a holographic stereogram printing system 10, the hologram recording medium 3 is driven to undergo translational movement along a track by an amount corresponding to one element hologram at a time by having the control computer 12 supply driving signals C2 corresponding to each element hologram to the movement mechanism 34 after the completion of exposure and recording of each element image, and then made to stop with an unexposed part aligned with the aperture of the mask 29. The holographic stereogram printing system 10 is constituted so that the vibrations generated in the hologram recording medium 3 which accompany the translational movement of said hologram recording medium 3 are rapidly stopped. Here, the hologram recording medium 3 is a photosensitive film in the form of a long sheet and, although not illustrated in the figure, it is, for example, wrapped around a supply roll disposed to rotate freely inside a film cartridge that is kept entirely shielded from light. When this film cartridge is mounted in the holographic stereogram printing system 10, the hologram recording medium 3 is paid out into the holographic stereogram printing system 10 and driven to undergo translational movement along the track by the recording medium feed mechanism 34.

In the holographic stereogram printing system 10 the shutter mechanism 22 is made to open in this condition, letting the object light L2 which is modulated as an image and the reference light L3 be incident on the hologram recording medium 3 from the front and rear sides to expose and record interference fringes corresponding to the element hologram image. In the holographic stereogram printing system 10, upon completion of the exposure and recording of each element image, a driving signal C2 is supplied to the recording medium feed mechanism 34 by the control computer 12 to drive the hologram recording medium 3 to promptly undergo translational movement by a specified amount and stop.

In addition, in the holographic stereogram printing system 10 a development process including a process of UV irradiation of the hologram recording medium 3 and a process of heating the hologram recording medium 3 at a specified temperature is performed by a development process module that is not shown in the figure in order to fixate the holographic stereogram image that is exposed and recorded on hologram recording medium 3. The holographic stereogram printing system 10 sequentially cuts the hologram recording medium 3, to which the fixation process has been applied, into each holographic stereogram image of a specified size that is externally discharged as a piece of holographic stereogram.

By subsequently performing this action sequentially, the holographic stereogram printing system 10 sequentially exposes and records a plurality of holographic stereogram images on the hologram recording medium 3 in the form of a long sheet to produce a holographic stereogram in which a sheet of holographic stereogram image has been exposed and recorded.

In the case of mass production of the same item, it is also possible to make duplicate copies in a short time by the procedure referred to as contact copying, in which the entire face of an unexposed photosensitive holographic material is exposed by laser light upon placing it in close contact with, as the original copy, a holographic stereogram produced as described in the foregoing.

Next, in the following, specific examples of holographic stereograms, of various media in which a variety of types of holograms can be mounted, and their illuminating devices will be explained. The variety of types of holograms include not only the Lippmann-type (volume-type) one-step holographic stereogram with horizontal disparity that is described in the foregoing but also include such types as the full-parallax stereogram with vertical disparity also added, holograms produced by actual capture of such objects as models by laser illumination, replicated holograms using these as the original pieces, holograms of the type with surface relief referred to as embossed holograms and diffraction gratings. In addition, they include not only reflective types in which the hologram medium is illuminated from the same side as the viewer, but also transmissive types in which the illumination is from the opposite side of the viewer and edge-lit types in which the illuminating light is incident from the edge of material with refractive index similar to that of the hologram recording layer and its base material. In the following, unless specifically stated otherwise, the holographic stereogram is also included as a type of hologram in referring to a hologram.

An example of a medium 900 in which the present invention is applied is shown in FIG. 9. A hologram 902 produced by the process described above is formed in a part or whole of a medium 901 with the size of a credit card of approximate thickness 1 mm, and side dimensions of 85.4 mm and 54 mm. An image can be printed with design and image processing in advance so that a holographic stereogram that is viewed from an approximately normal direction is reproduced as a two-dimensional image when illuminated by a light source at a prescribed position and a prescribed angle. It is also possible to reproduce different images when illuminated from a plurality of known positions of the light source. In the case of the present embodiment, the information at the position shown as 905 that is converted to a two-dimensional barcode is reproduced when illuminated from approximately 45 degrees to the left and at a tilt of 30 degrees below, and a different barcode is reproduced in the same position when illuminated from approximately 45 degrees to the right and at a tilt of 30 degrees below. In addition, other barcodes 903, 904 are printed outside the hologram zone on the base of the medium.

An image reproduction device 950 in which the present invention is applied is shown in FIG. 10. A slot is formed in the base 913 of the image reproduction device 950, into which a part of the medium 900 described in FIG. 9 can be inserted, and the inserted state is shown in (A) and (B) in the figure, as well as the YY cross-section and the XX cross-section of each. Seven LED light sources, L1-L7, are mounted so that, when the medium 900 is placed in its prescribed position, it can be illuminated from different positions at prescribed angles toward the approximate center of the hologram.

Power may be supplied by connecting a home AC power source to inlet 910. However, batteries such as dry cells and rechargeable cells may be incorporated without an external supply, or power may be supplied from such units as smartphones.

With a USB connector 911, it is possible to control the driving of the LEDs from the smartphone side if a smartphone 914 is connected by USB cable. That is, by controlling L1-L7 to be lighted one at a time in sequence, it is possible to show a moving three-dimension image to a viewer who is approximately directly facing the hologram. After lighting L1-L7, they may be lighted in reverse sequence L7, L6 . . . L1 or in repetition L1, L2 . . . L7. In this process, the ability to control the light sources from the smartphone side provides great advantage in enhancing the presentation effect in conjunction with various applications from the smartphone side.

Connection by USB cable also provides the advantage of making it possible to enjoy hologram viewing while charging the smartphone. That is, this may be regarded as an AC adapter for charging a smartphone that also has the functionality of reproducing holograms.

If a secondary cell such as a lithium-ion cell is incorporated in the image reproduction device, it can also play the role of a mobile battery, adding the functionality of enabling hologram viewing without always supplying AC power. That is, this may be regarded as a mobile battery that also has the functionality of reproducing holograms.

Speakers 915 are incorporated in the image reproduction device, making it possible to listen to music and voice content not only with the smartphone but also from the image reproduction device.

If storage devices such as memory and hard disk are incorporated in the image reproduction device, it is possible for the stand-alone image reproduction device to play back sound in addition to driving the LEDs, without the smartphone, by transferring and storing content downloaded by the smartphone to the image reproduction device. On the other hand, the image reproduction device may be without a storage device, and have data such as sound data transferred in real time from the smartphone side.

Signals for light source control and sound data may be sent from the smartphone to the hologram reproduction device through wired connections such as a USB cable, or through non-contact communication channels such as Bluetooth (trademark), WiFi (trademark), infrared or NFC. Power supply can also be made wireless.

The smartphone incorporates software with functionality as in the following.

A-1 Capture and decoding, by an image sensor incorporated in the smartphone, of barcode information printed in two dimensions on the medium.

A-2 Fixing of the auto-focus function of the image sensor upon successful decoding A-3 Determination of the known zones for capture of holographic barcodes relative to the position at which a two-dimensionally printed barcode is captured, and initiation of sampling at regular time intervals in that zone.

A-4 Issue of a command to light the L1 light source to the holographic image reproduction device.

A-5 Capture and decoding of the holographic barcode with the sampling intervals and moving to the next process if successfully decoded. If not, retrial of the decoding a limited number of times (for example, ten times). If decoding is still unsuccessful, notification of the user of the abnormality.

A-6 Upon successful decoding, issue of a command to light the L7 light source and carry out the same procedure as A-3 to A-5.

A-7 Move to the next process with the information decoded in A-5 and A-6.

For example, if URL information or encrypted password information that is not otherwise made public is contained in the decoded content, it is made possible to render authenticity judgment functionality since access is not possible unless this medium is owned. Although the number of light sources is seven, L1-L7, in the present description, the method can be applied with any number. For an effective presentation of the continuity of the image of the holographic stereogram, the number may be as many as about 30-100.

In the case that decoding is unsuccessful in processes A-4 and A-5, the smartphone and the hologram medium may not be in the prescribed positional relation to each other. In such a case, decoding may be attempted by illuminating with a neighboring light source such as L2 in place of L1. Alternatively, the smartphone side may communicate to the user by screen display or sound to slightly shift the smartphone to facilitate decoding.

Although two different barcodes are recorded holographically in the preceding description, a functionality can be provided that can only be realized with a hologram even with only one. This is because of the unique characteristic of the holographic barcode that it can be decoded when illuminated by a certain light source but not when illuminated by a different light source at a similar level of illuminance.

On the other hand, three or more different holographically recorded barcodes may be printed and a number of light sources equal to or greater than that number may be put in the corresponding reproduction device. A greater number is able to provide a higher level of the security functionality.

The lenticular photograph is a technology of media that is similar to the hologram. That is, it reproduces different information when viewed from different angles, or a three-dimensional image, as a multi-view image by the lens effect of a lenticular plate, but this is not able to produce changes of the image seen from directly in front even when the illuminating light is changed. Thus, use is made of a phenomenon that is unique to the hologram. It is difficult to make counterfeit copies of a hologram, which is characterized by the ability to record with far greater density even compared to ordinary printed media or lenticular photographs, the difficulty of its production and the restrictions on the materials and devices required.

There are various countermeasures to prevent counterfeiting of the hologram itself, and it is possible to perform them.

Here, two- and three-fold means of prevention are arrayed against presumed malicious actions to simulate successful authentication similar to that with a hologram medium despite its absence. Since a full disclosure with regard to the present invention could aid such disguising actions, only the essence and a few examples are disclosed.

For example, it may at first appear to be possible to decode by video recording the scene of capturing and decoding, and then capturing such a recording that is displayed on another display or smartphone. However, by making the timing of the illumination by L1 variable every time, lighting it after holding for a period determined by a random function and turning it off immediately after successful decoding, the foregoing case can be rejected since the timing of the pre-recorded decoding is not matched. Since the periods of lighting, not limited to a random pattern, are known on the side of the portable console, and it is impossible that successful decoding takes place when not lighted, a variety of patterns for authenticity judgment can be made to function. It is due to the use of widely used portable information consoles to issue lighting commands and perform capturing and decoding that the powerful authenticity judgment functionality can be effective.

Various patterns of the algorithm for judgment of authenticity are possible in addition to those described in the foregoing. If these are encrypted, and software and libraries based on the algorithm for judgment of authenticity are supplied over the network from a host server, the authenticity judgment functionality can readily be revised with a new algorithm if a certain algorithm should happen to be penetrated.

Although two different barcodes are made to be recognizable from two directions in the example described in the foregoing, the number may be single, or it may be three or greater. A greater number produces a more powerful authenticity judgment functionality. This is because even if a malicious person, for example, places an image sensor inside the illuminating device and encodes and displays on another display in real time the barcode image that would be reproduced by the hologram, it is difficult to accurately detect the direction of illumination in any attempt to read it with the decoding smartphone.

Furthermore, an example is described by reference to FIG. 14 in which, after deliberately processing the image so that only a part of a barcode can be reproduced with a single light source, reconstruction is performed from captured data of reproduction with a plurality of light sources.

For example, a partial barcode as in (a) is reproduced when lighted by L1. Similarly, (b) when lighted by L4 and (c) when lighted by L7 are captured, and these can be joined together in the memory of the portable information console to reconstruct a complete two-dimensional barcode as in (d). First reconstructing a full two-dimensional barcode before decoding and to then proceed to authenticity judgment or the next program step provides an additional countermeasure against counterfeiting. The design of the image reconstruction algorithm is undisclosed since it is related to the image processing procedure of the holographic stereogram, the specifications of the optical system in which it is reproduced, and the timing with which it is illuminated. The order of lighting is not limited to L1→L4→L7 and may be freely altered so that it can be a countermeasure against counterfeiting if changed every time a judgment is executed.

If light sources with fast response characteristics such as LEDs are built into an image reproduction device, and an image sensor with fast response characteristics such as CMOS is used as an image capturing device to capture by rapid switching at less than, for example, 1 millisecond, it is very difficult to disguise with a different light source in real time even if the method of controlling the light sources were to be reverse engineered.

Although the conditions for recording the hologram are, not only in this embodiment, undisclosed since the appearance of a hologram depends on such factors as the type, angle and diffuseness of the illuminating light for reproduction, if consistency with those conditions for recording is checked based on the conditions, and by using the relative positions of the light source and the imaging device during reproduction, various modifications are possible.

Examples of applications utilizing this authenticity judgment functionality are described in the following.

Here, since such aspects as the purpose and prerequisite components differ among the cases, which are mainly, Type (A) Cases in which the owner of a portable hologram medium performs reading with a portable information console.

Type (B) Cases in which the information console for reading is immobile in a certain location and the owner of the hologram medium performs reading at its specific location.

Type (C) Cases in which the hologram medium is not presumed to be portable, and the medium which is immobile in a certain location is read by the owner of an information console.

they are described with specification of the type.

First, an example of using an access key to special content is described presuming the case of Type (A). An image such as a portrait of a well-known personality or an animation character is seen on a hologram card and sound data related to this content, that is, voices of the personality or character, can be heard by reading a two-dimensional barcode with a smartphone.

Whereas a conventional music card in lieu of a music CD is used as an item that enables downloading of artists' tracks by reading and entering a printed PIN code after scratching to scrape off a protective layer on the card, by making a medium in which a hologram is attached to this card and mounting it in a hologram reproduction device, it is also possible to couple reproduction of the hologram with the playback of the music. This will not only enhance the design of the music card but also add functionality. For example, it may be arranged that tracks can be downloaded with a unique code number for a music card to save them in, for example, a smartphone, but that a part of the data cannot be accessed without reading a holographic barcode. In downloading, if the right to access can be automatically acquired without a tedious procedure, by means of dedicated software in the smartphone, by the processes A-1 to A-7 described in the foregoing it can be made possible for the user to download with ease. Once successfully downloaded, it may be made possible to have access at any time thereafter, or determination of right to access as described in the foregoing may be made to be required at every time of listening. Further, implementation of the determination of right of access to content updated daily will enable the user to listen to new content data without the trouble of entering codes such as passwords, thus avoiding awareness of the process. If the lighting of the light sources for illumination of the hologram is controlled according to the music or voice, it is also possible to create a presentation effect as if the speech is synchronized with the hologram image. Schemes are possible such as to increase the speed of sequential lighting with an up-tempo number and decrease the lighting speed with such numbers as slow-tempo ballads.

As another application in which the present invention is embodied, a hologram-related toy in the form of a medal is described. A hologram of an animation character is attached to the medal, and such sounds as the cry or name of the character is played back when it is mounted on a toy in the form of a watch. Light sources are internally mounted in appropriate positions inside this toy, and the hologram part of the medal-form toy is captured with a portable game console. If the portable game console is equipped with an image sensor and means of communication, access will be possible to data on a server that can be accessed only by the owner of the hologram by a process similar to the combination of a hologram reproduction device and a smartphone as described in the foregoing.

A second embodiment, in which the present invention is applied, is described by reference to FIG. 11-FIG. 13. By applying the present invention, it is possible to perform judgment of authenticity using a portable information console with an image sensor and a light source for illumination, without any special reproducing device.

After printing a two-dimensional barcode, such as that which is shown in FIG. 13, on such items as the music card as described in the foregoing, various certificates, medical packages or commercial tags of branded merchandise, a holographic barcode is attached to some part thereof. In the case of FIG. 13(A) there are, in addition to the extended arrows to the left and right and the two-dimensional barcodes PB1a, PB1b printed by an ordinary two-dimensional printing method, a holographically recorded barcode HB1 that is attached in the center. In FIG. 13(B) also, there are similarly, a holographic barcode HB2 and a two-dimensionally printed barcode PB2 attached above and below each other between the arrows. Here, attachment refers to adhesion of a medium comprising a hologram recording material using a pressure-sensitive adhesive or a heat-sensitive adhesive, preferably in such a manner that it cannot be separated from the base material without destroying the hologram layer.

The arrows indicate the directions of relative movement in reading the holographic barcode. The reason for filling the inside of the arrow images with fine texture is to facilitate autofocusing by the image sensor.

With regard to the example in FIG. 13(A), the method of reading is explained by reference to FIG. 11. In the case of iPhone 6 of Apple, Inc. the image sensor capable of high speed capture and a light-source LED that can be driven at a high speed are placed approximately 10 mm apart. Reading a holographic barcode by holding such a smartphone with the long dimension sideways is considered. If an attempt is made to capture the printed barcode area from the direction directly facing the medium, that is, from the normal direction, the hologram must be read as an image reproduced with light incident at nearly zero degree, so that if the surface of the hologram is illuminated by an LED mounted in the smartphone its direct reflection enters the image sensor, causing difficulty in reading the barcode. Therefore, the capture is made to be in an oblique direction in such a manner as to aim from somewhat in front in a direction about 20 degrees to the rear to avoid entry of the directly reflected image. Whereas, in the case of facing directly, reading is easiest when an image as shown in FIG. 11(A) is printed, actually a slight trapezoidal distortion is applied before printing. When slanting the smartphone, if the two-dimensional barcode to be aimed at on the monitor screen is made to appear square, it will necessarily be possible to capture at the ideal angle. FIG. 11(D) shows the monitor image seen on the smartphone screen. A square guiding mark is displayed in (a) during capture so that it is possible to fit the holographic barcode inside the zone (b) at the ideal slant when the smartphone is held in a way that removes the trapezoidal distortion and also matches the size. It is possible to make it possible to read the holographic barcode without distortion when the relative positions are as in (D) by facilitating the reading of the holographic barcode, or, as described in the following, reading may deliberately be made difficult. In the case of FIG. 11(D), distortion is applied so that a square two-dimensional barcode is easily read despite being from a slanted direction.

The image sensor and the light source generally are placed on the side opposite to the monitor in many cases. In order to use the monitor to confirm the manner in which the holographic barcode is being read, it is intuitively easiest if the eyes of the user, the smartphone and the holographic barcode are nearly aligned in a straight line in this order. On the other hand, since entry of the direct reflection of the hologram and the base material makes reading difficult if the alignment is exact, the reading is designed to be possible when slanted at 10-30 degrees upward or downward. The case of reading from below is mainly presumed in the present description. This affords ease of reading when the card is placed on such platforms as a table. However, there is a disadvantage that possible reflection of such objects as ceiling lights would cause difficulty in reading. As another case, it is possible to read from above. This is suitable in situations where the holographic barcode is attached to a wall, or on a card that is held by a display such as that shown in the figure. If such supports as posters are used for high placement it is possible to read from below, but for ease of reading by persons of various heights, it is more desirable to place the poster in a low position to make the reading be from above and by aiming downward. This is because, when a tall person reads a holographic barcode that is placed in a low position to be read from above, this is possible by squatting, but there are cases in which a short person is not able to read a holographic barcode that is placed in a high position.

It is possible that the user may be confused if both the type that should be read at an angle from above and the type that should be read at an angle from below exist together. Therefore, in the present invention, the shape of the medium of the holographic barcode is made to be in the form of an arrow that also indicates, in a readily recognized manner, the direction from which the holographic barcode should be read. This also has the effect of preventing mistakes in the up-or-down orientation in attaching to such supports as posters or cards.

The base material of the holographic barcode is made black in order to enhance contrast. However, it may be chosen to be transparent so that what is printed on the lower surface can be seen through. In addition to having the effect of preserving the design of such supports as posters, it also makes it possible to print a two-dimensional barcode on the lower surface for reading and decoding both. By overlaying in a plane the two-dimensional printed barcode other than the holographic barcode which is described in the present invention, not only is there an effect of reducing the area required for the present functionality, but if the holographic barcode is attached to the substrate base material with a transparent adhesive with strong adhesive strength, it is also possible to provide a tamper evident effect by making the substrate material become destroyed at the same time when it is attempted to peel off the holographic barcode.

As a variation of the embodiment in the form as shown in FIG. 10, a form is described in which, together with the placement of an image hologram of a device that is illuminated at an angle from below in order to view the image hologram, a holographic barcode is recorded by a method such that it can be read from above at an angle. When a smartphone is used to read from above at an angle and aiming downward at an angle two or more pieces of information embedded in printed codes in the hologram or its vicinity, special content related to the image hologram is played back from the smartphone. In this case, the configuration may be made simple since such functions as means of communication are not required in the viewing device. Further, there is also the advantage that the holographic barcode for reading information does not interfere with the viewing of the image since it is not reproduced by the light source for viewing of the image even if it is printed on the same material as that of the image hologram.

As the authenticity judgment process,

B-1: A message is delivered to the user by voice or on the screen to hold the smartphone and fit PB1a inside the frame of (D)(a) so that it is square
B-2: Decode the barcode inside the frame of (D)(a)
B-3: Tentatively fix such functions as the auto focus after completion of the decode described above
B-4: Capture and decode the holographic barcode in area (D)(b) at a certain sampling interval
B-5: A message is delivered to the user by voice or on the screen to move the smartphone to the right and fit PB1b inside the frame of (E)(c) so that it is square
B-6: after completion of the decode described above, capture and decode the holographic barcode in area (E)(b) at a certain sampling interval It is possible for the data from the holographic barcode that is read in B-4 and the data from the holographic barcode that is read in B-6 to be different, even though they are data which can be decoded from the same area of the same medium, because of the use of the hologram.

As another example, the case of reading a design such as that shown in FIG. 13(B) is explained by reference to FIG. 12. There is no problem with printing as in (A) in the case of reading from directly in front, but each barcode is printed with a shape as in (B) for easy recognition when capturing at a tilted angle. When the smartphone is held so that the barcode is centered, an undistorted image can be obtained as in (C). Then when the two-dimensional printed barcode PB2 has been successfully read, the auto focus of the image sensor is fixed and an instruction is issued to the user to move the smartphone back and forth in the direction of the arrows.

The information of the holographic barcode changes moment by moment while moving back and forth within the zone of the screen, that is, between the conditions (D) and (F). Here, whereas it is possible to use as the barcode information recorded as a hologram, data which have been image-processed in advance as shown in (E) (G), reconstruction may also be deliberately presumed, without being able to read a complete barcode at a certain time. As it was explained in reference to FIG. 14, a whole barcode can be acquired by cutting out parts of a barcode by a plurality of relative positions of the hologram, light source and image sensor followed by reconstruction, and decoding it enables machine reading of the information recorded in the hologram. In other words, a motion picture barcode is recorded as hard copy, and acquisition of the encrypted information is made possible by reading while controlling the light source of the portable information console.

Further, such sensors as acceleration sensors and gyro sensors are incorporated in iOS and Android smartphones, and the outputs of their sensing can be utilized. For example, during back-and-forth swaying movements, it is possible to light a light source only when the movement is in one direction and turn off the light source when the movement is in the opposite direction. This makes it possible to detect the contrast of a holographically recorded barcode.

There is especially a difference in appearance of an embossed hologram and a Lippmann hologram when the illumination is turned off and when illuminated by monochromatic light. A genuine Lippmann hologram, even when counterfeited as an embossed hologram, can be rejected as a fake item. Whereas in the case of the Lippmann hologram light other than that which meets the Bragg diffraction condition is transmitted to be absorbed by such material as the base material in the rear, in the case of the embossed hologram, since the transmitted light is often reflected by a reflection layer such as that of a silver color in the rear, the difference can be proven by analyzing the captured image. For example, when a hologram that is intended for reproduction as a green hologram is illuminated by a red LED, whereas one made by the Lippmann method is not reproduced at all, one made by the embossed method will be reproduced, only with a different direction of diffraction.

If such material as metallic flakes, phosphors or forensic material is mixed into such constituents as the hologram layer, its protective layer or base material, or the layer of their adhesive material, and their presence is together captured, they may be made to be elements for judgment of authenticity not just with the barcode.

The barcode may be printed by a mass production method in batches by content or the product model, or it may be made as an individual ID without a single duplicate. It is rather the use as an individual ID or serial number that widens the scope of applicability such as in tracking and traceability systems. The holographic barcode may be made the individual ID, but even by just making the two-dimensional printed barcode the individual ID, the authenticity judgment functionality can be exploited, together with the difficulty of counterfeiting the holographic barcode.

With rapid shaking, reading may be difficult because of difficulty in focusing or by blurring of the image. Therefore, focus is adjusted on the portable information console using a two-dimensionally printed marker image in the vicinity of the hologram. Then, by making the shutter faster and capturing at a high frame rate of approximately 240 fps, the sharpness of the captured image is improved. It is possible to improve sharpness also by switching the LED on and off rapidly, without making the shutter faster or capturing at a high frame rate.

It is ideal to read with the portable information console slanted at an angle of tilt of approximately 15-20 degrees with respect to the normal to the face on which the two-dimensional marking and the holographic barcode are printed or attached. Due to the structural design of smartphones and game machines, the light source for the purpose of use as a flashlight is frequently placed not far from the image sensor. When capturing from directly in front of the medium, the light source that is directly reflected at the surface or by the rear surface of the hologram medium directly enters the image sensor and capture with good contrast is difficult. If the angle is made too steep the reading of the barcode becomes difficult. Thus, a holographic barcode that may be captured by tilting 10-45 degrees is recorded. In the examples in FIGS. 13 (B) and (C), the direction from which capture should be performed, including the optimal tilt angle, is clearly indicated. FIG. 15 shows an example of a holographic barcode in the form of a sticker that is attached to a card, and it can be intuitively recognized that it is a type for capture from below at an angle since the shape of the cutout as a sticker is in the form of an arrow.

In the example described above, a square frame is displayed on the screen of the smartphone for fitting the two-dimensional barcode, but inasmuch as a marking symbol is formed in such a way that the direction from which to illuminate, and the direction in which the portable information console should be moved, can be recognized intuitively, the shape and method are not necessarily limited to those in this example. Further, it is also possible to form not one, but two or more, two-dimensional barcodes or marking symbols and utilize them for information about the orientation of the portable information console by analyzing their relative positions by image processing.

Further, a two-dimensional barcode was used as the marker image for aligning the position of the smartphone, but it is not limited to this example. The image may be made to be such as to facilitate the derivation of the relative positions with respect to the image sensor by image processing. For example, if an image in the form of a grid is two-dimensionally printed, since the relative positions and relative angles of the portable information console and the hologram can be derived by analyzing such information as the trapezoidal distortion of the captured image, it is possible to judge whether or not the hologram image obtained under that condition is genuine. There is also an advantage that the focusing is facilitated if the marker image is a finely patterned image with large contrast. The texture inside the arrow in FIG. 13 (A) can be utilized also for this purpose.

The marking image can also simply be rectangles in which the order of reading such as 1, 2 is marked. It is suitable if the rectangles are in trapezoidal form which considers the trapezoidal distortion. That is, in the configuration as shown in FIG. 15(a), in addition to printing a first guiding mark 151, a second guiding mark 152 and a two-dimensional barcode 154 on the card 156, a holographic barcode 153 is attached to the card with an arrow pointing upward as the shape of the sticker. The two-dimensional barcode is printed in black ink on a white background, whereas the holographic barcode is a green barcode on a black background. This is in consideration of the ease of reading and of printing, but they can also be formed with negative/positive inversion or with different colors. A figure with 1 drawn inside a rectangle is displayed on the smartphone screen and it is prompted to match the figure with the actual captured live image of the corresponding printed figure displayed on the smartphone monitor. Since, not only is the adjustment of the distance between the smartphone and the hologram medium facilitated by the matching of the sizes of the rectangles, but also the lower side of the printed rectangle is drawn to be somewhat shorter than the upper side, the shape of the marking is suitable for finding the optimal position of the smartphone that is held and aimed from below. After the first code has been read, a figure with 2 drawn inside a rectangle is displayed on the smartphone screen and guidance is given to facilitate the reading of the second code.

The position of the image sensor and the light source is different in each model of a smartphone or a portable information console. In particular, there are great differences among smartphones using the Android OS because of the original designs of various manufacturers. Since, as described in the foregoing, appropriate reading of a holographic barcode depends on the relative positions of the light source and the image sensor, the indication of guides to facilitate reading is required to be different for each model. As models with different specifications will be released in the market into the future, the practice as described in the following is devised in the present invention. The flow chart of the procedure is shown in FIG. 18.

Thus, upon transmitting to a network server from an application in a smartphone its model information, it is looked up in a list of registered models, and if it is a registered model the positional coordinates of the recommended guiding marks are returned to the smartphone application. The smartphone application displays the recommended guiding marks. If the model is not registered, this information is received from the server, and a general set of guiding marks are displayed for rough matching. In such a case, although reading is not easy for the user, once successfully read after even an extended attempt, the information of the coordinates is sent to the server. In this way, information about the conditions when reading is successful can be collected and stored as a database. In this process the time taken to perform reading is also sent to the server. The positional coordinates of the recommended guiding marks are determined by analyzing this database and added to the list of registered models together with the model information. By sending to the server, including for the registered models, the positional coordinates when all readings were successful, together with the information about the time taken to perform reading, and, for example, making a program to generate a list of the average coordinates of the top five items in shortness of time taken to perform successful reading, analysis by human labor is not required and display of guides for easier reading can be made to be automatically provided. Use of this system has the advantage of enabling the automatic collection of the conditions for easy decoding for each model without spending time and labor to try and test the portable information console models that will continue to increase.

Whereas, in the foregoing, examples of performing authenticity judgment by the ability or inability to read a holographic barcode are described, it is also possible to exploit the characteristics of the hologram and use the obstruction of reading by controlling the light source as an element in authenticity judgment. In a simple case, if reading is possible without lighting the light source, judgment of a fake item is possible since reproduction of a hologram is not possible without illumination by a light source. Further, if, in contrast, illumination is by a plurality of light sources, decoding of the barcode is made impossible since a plurality of images are captured in superposition. When a plurality of LEDs are controlled to illuminate at an illuminance comparable to the case of lighting a single LED, a common two-dimensionally printed barcode would be possible to read without any problem, but a holographic barcode would be impossible to read, so that it is possible to add a judging algorithm that identifies a fake item if decoded by simultaneous lighting of many LEDs. Thus, by continued sampling at certain time intervals for decoding, and by lighting or not lighting the LEDs, or by lighting many LEDs, the ability of a genuine item to be read at timings in which it should be possible and/or the inability to be read at timings in which it should not be possible can be used for judgement of authenticity.

Capturing at high speeds such as 120 fps and 240 fps facilitates decoding since images without blur can be obtained even in data captured with rapid movement.

As the auxiliary light source LEDs for capturing that are incorporated in portable information consoles, there is the LED that is made quasi-white by combining a blue LED and phosphors, as well as a type in which three LED chips, red, green and blue, are placed together in a single package. In the case of the RGB tri-color LED, it is possible to light it as red or light it as green. With a holographic barcode, if a code that diffracts red and a code that diffracts green when illuminated by white light from the same position are recorded, a red barcode can be decoded when illuminated by red light, and a green barcode can be decoded when illuminated by green light. In this way, the user is able to read the unique characteristic of a hologram without changing the relative positions of the portable information console and the hologram, by changing in the time frame to sequentially illuminate with red and green light.

For example, a partial barcode that can be reproduced with red light and a different partial barcode that can be reproduced with green light can be sequentially or simultaneously captured, synthesized by image processing and decoded as an integral barcode. This description involves red and green, but holograms of the corresponding colors as LEDs of blue, infrared or ultraviolet wavelengths can also be made to be read.

Exploiting the means of communication with a remote authentication server that the capturing device, that is, the smartphone, gaming console or portable information console, is equipped with, such information as lighting control signals to the hologram reproduction device, the images captured upon using these signals, the content of data after optoelectronic conversion and the time taken for the conversion may be exchanged with the server. If the portable information console incorporates a GPS (global positioning system) function, the location where the reading is performed may also be exchanged with the server. Since information about where the reading is performed can be obtained, there would be applications which can use it effectively.

It may also be arranged that the information for controlling the light sources to illuminate the hologram is sent from a remote authentication server, the video captured in real time and the content of data resulting from optoelectronic conversion are sent back to the authentication server, and the authenticity judgment is performed on the side of the server. That is, upon encrypting the information read from a holographic barcode together with such information as the reading conditions and parameters, they are sent from the portable information console with light sources and an image sensor to the authentication server on the network. On the side of the authentication server, this information that has been read is checked against such information as the reading conditions, and then redirection to another content server or return of information about access rights to the side of the console can take place if the hologram is judged to be genuine.

The information that is sent from the side of the console to the side of the authentication server may include such information as the unique console information and information about the owner of the console. In this way, without granting access rights unconditionally when there is a genuine holographic barcode to which the present invention is applied, an operation is possible such as to make access possible only from a specific console or by a specific person, or, in contrast, to prohibit access from a specific console or by a specific person. For example, if the console information upon the first activation, linked to the holographic barcode information and the printed barcode information, is stored in the console or on the side of the authentication server, and checked upon access, an operation is possible in which access from a console other than that used at activation is prohibited. In this way, if an item that has been distributed as a security card should become lost or stolen, the risk of its misuse can be reduced.

Further, at least a part of the authenticity judgment algorithm may be sent from the side of the remote server to the side of the capturing device and the judgment of authenticity performed in the capturing device in real time in the absence of communication.

In the foregoing, with regard to a method to perform judgment of authenticity using a hologram and an information processing device with an image sensor, the method of image recognition and the medium have been described, with concrete examples, which are characterized by comprising a procedure to generate at least two different conditions of the relative positions of the hologram medium, the light sources and the image sensor, or of the conditions of lighting of the light sources, a procedure for the information processing device to acquire the information which stipulates the said different conditions by means other than the said image sensor, and a procedure to perform authenticity judgment of the hologram medium by the consistency or inconsistency, with the information stipulating the said different conditions, of the result of analyzing or decoding at least two images acquired by the said information processing device from the image sensor.

Although the embodiments have been described mainly with reference to information processing devices in terms of portable information consoles including smartphones, cell phones and portable game consoles, application is possible to any device with an image sensor and information processing capability.

The relative positions among the hologram medium, the light sources and the image sensor can be changed by moving one or two members among these three devices.

Further, with reference to the means for the information processing device to acquire information stipulating the different conditions, although examples have been described mainly in terms of its controlling the light sources, should the light sources be controlled by a device other than the information processing device or from the side of the hologram reproduction device, the information or control signal related to the control may be sent to the information processing device by wired or wireless means.

In order to implement this, it is desirable that the hologram reproduction device has a means of communication with external devices and that the hologram reproduction device and the information processing device share information about the conditions in real time during the lighting. When, as with a smartphone, a light source for strobe lighting located in the vicinity of the image sensor is utilized for reproduction of the hologram, information about the lighting and of the capture can easily be shared within the portable information console.

Whereas a desirable embodiment has been described in the foregoing, concrete examples of desirable embodiments are not limited to that which has been described. For example, the portable information console may not only be in handheld form but also in a wearable form such as watch-type.

Since it is sufficient for the hologram, the light sources and the image sensor to be able to be moved relative to each other, the portable information console may be held fixed and the left-right movement be made on the hologram medium side also.

Although the foregoing description has presumed operation only by a handheld portable information console, a simple adapter may be an accessory to the portable information console that enables fixing of the position of the hologram in order to maintain the hologram information with the definite designated positional relationship. That is, a transparent window or a hole is formed in the protective case of the smartphone so that, if the hologram is fit there, accurate decoding can be performed since the positional relationship between the light source and the image sensor is uniquely determined.

An example of constructing a system by developing this to be a non-portable dedicated reader device is described by reference to FIG. 16. A smartphone 161 is held incorporated inside a housing 160, and light is designed to reach an opening 165 by way of a reflecting mirror 164 from the image sensor 163 and LED light source 162 belonging to the smartphone. When a card 157 carrying a holographic barcode as shown in FIG. 15(b) is moved to insert it through a guiding slot 166 formed in the housing, the information can be read as the holographic barcode and the printed ID code on the card comes near the opening 165. Since the angle and position can be fixed, more accurate, more reliable and faster reading is possible compared to the case of reading with a handheld smartphone. The focus and gain can be fixed since such conditions as the distance from the image sensor to the card and the lightness inside the housing are constant. In addition, since the area to be read is more limited than in the handheld case the zone to be decoded can be made smaller and thus the interval required for image processing shorter, making rapid reading possible. Light is turned on just as the guide is passed through. Reading may be performed by stopping at one or two positions, or a scan may be made while moving and the image data processed. Light is turned on/off at a known high speed. Line and space scale marks 155 or markings indicating the position of attachment of the code are formed on the card, and by image analysis the scan position and scan speed can be deduced. Although an example of using a single reflecting mirror is shown in FIG. 16, two or more reflecting mirrors may be used. If an odd number of reflecting mirrors is used, it is necessary to apply a mirror image inversion to the image in the application software.

Use of such a device is effective, not only in configuration (A), but also in (B) in the foregoing, that is, the case with the information console for reading fixed at a certain venue and reading of the hologram medium performed by the user at that specific venue.

Application is possible, for example, as an attendance management system which also serves as time cards. A holographic barcode is attached to such cards as employee IDs, the information that is read is transmitted to the authentication server, and the authentication server records such information as time stamps upon judging whether or not the data is genuine. The record may be made in any device such as in the authentication server, in another server or in the console which is the reader device.

Similarly, other examples of configuration (B) may be as the reading of information of credit cards and cash cards in such venues as storefronts and as an auxiliary authentication system of ATMs. If the present invention is applied to cards in the financial field and authentication is performed by smartphones at hand, it can be used as an auxiliary authentication key when shopping on the internet. At present, when charging to a credit card, the credit card number and the security code information on the back side are mainly transmitted electronically. Crimes occur frequently since the credit card number and the security code can be transmitted electronically in the absence of the card in hand. Although measures are being taken to embed an IC card or a non-contact IC card in the credit card, their wide-spread use by the general consumer is difficult since a scanner for reading is required that is expensive. In contrast, there is a great advantage of the present invention that allows the use of the smartphone which has a high adoption rate. On the other hand, there is also a demand to be able to perform in such venues as the storefront reliable and fast reading of credit cards carrying the holographic barcode in which the present invention is applied. In this case, there is an advantage that, by using the non-portable dedicated reader device such as described with FIG. 16, the reading operation can be performed easily in a short time by even an unskilled clerk.

As an application of another configuration (A) in which the present invention is applied, an example of use as the access key to a network camera is described. There is a great demand in such places as nurseries, kindergartens, nursing homes and childcare institutions to be able to allow only the next-of-kin of care-receivers to be able to view what is captured by cameras installed in the institutions and connected to the network. On the other hand, if a malicious person other than the next-of-kin is able to gain access, there is a problem from the point of view of management of private information and there is a risk that it may even lead to a crime. Usually, management is by passwords and, in many cases, only a person who knows the password is permitted access, but this requires providing passwords to many persons if a great number of specified persons are to be permitted access, which presents difficulties in their management. By applying the present invention and issuing cards carrying holographic barcodes to the next-of-kin such as guardians, only their owners will be able to have access. The hologram has the advantage that it will not be multiplied since it cannot be illegally copied.

In the foregoing, although the portable information console is described to originally have both an image sensor and light source incorporated, even if the information console does not incorporate either or both the image sensor or the light source, if the relative positions of the image sensor and the light source can be specified and wired or wireless connections can be made to satisfy the purpose and function of the present invention, its application is possible. For example, it is possible to connect an LED light source by USB to a tablet or a note PC and use an adapter that fixes the positional relationships with the image sensor and the LED light source.

An example of Configuration (C) described in the foregoing, that is, the case of reading, by the owner of an information console, a hologram medium that is not presumed to be portable that is immobile in a certain location, is described by reference to FIG. 17. In this case, since the reading of the holographic barcode is facilitated by being fixed to an immobile part, the holographic barcode 172 and a two-dimensional printed barcode 173 are fixed on a tilted surface at the optimal reading angle inside a box 174. Guiding marks for aligning the contour of the smartphone, or the positions of the LED and the camera, as well as apertures or aligning shapes may be formed to facilitate the alignment by the user of the smartphone 171 in the specified position. For the major smartphone models in the market, templates such as TYPE A, TYPE B . . . may be provided and the template may be changed for a model before reading. There may be a plurality of apertures, according to the specifications of the holographic barcode. For example, upon successful reading by fitting to a first aperture 175, guidance by voice or screen display may be provided from the side of the application software to fit to a second aperture 176. Further, the aperture is an elongated hole 177, and the information acquired in sliding the smartphone over a certain distance may be used in a continuous or discrete manner.

Here, the meaning of an aperture refers to the property of optical transparency, and by making the whole unit closed and using scratch-resistant uncolored transparent plastic or reinforced glass material for the aperture, it is possible to avoid entry of dust and protect against tampering.

If the whole unit is made closed, security is further improved by additional schemes to obstruct reading of the information of the holographic barcode by methods which do not utilize an application software implementing the present invention. For example, in the usual condition, the holographic barcode is placed in a position in which the angle of illumination is misaligned, or in which light from the LED light source enters the image sensor directly by mirror reflection, by which reading is prohibited. The construction may be such that encrypted information is transmitted by Bluetooth or sound only when being read by a genuine application and the positions which allow the reading operation are assumed for a defined length of time only when this information can be received by a receiver incorporated in the box. Instead of moving mechanically, control may be implemented so that, by placing other LED light sources inside the box in positions such that the mirror reflected light enters the image sensor, prohibiting reading by lighting the LED light sources when the illuminance inside the box exceeds a defined value, and then allowing reading by turning off the LEDs inside the box when genuine application software is run and it is communicated from the smartphone side to the box side that it is genuine software. Within the box, the position at which mirror reflected light enters the image sensor is on the line, or its optical extension, which is approximately symmetrical with respect to the holographic barcode medium normal, to the line joining the center of the holographic barcode medium and the aperture of the lens of the image sensor. The optically extended line is the extended line which takes into consideration the reflected ray even in the case that a mirror is used. The means to communicate that the software is genuine, in addition to Bluetooth or sound, can also be realized by high-speed modulation of the LED on the side of the smartphone and analysis of the modulation by a photosensor device incorporated in the box.

During reading, it is possible not to directly display the picture of the reading process on the smartphone screen, but to make at least a part of it blurred, replaced, deficient or have added noise. In this way, the algorithm during capture can be made difficult to decipher.

The construction may be such that the hologram itself cannot be removed without destroying it. If the peeling strength of the adhesive material that is in direct contact with the hologram recording material is made to be greater than the cohesive strength of the hologram recording material itself, the hologram itself would necessarily be destroyed if its replacement is attempted. Even in such a case, the device can be made usable again without replacement in whole by setting a new genuine holographic barcode.

On the other hand, it may be made possible for an administrator to replace with a number of different barcodes. After replacement, the authentication server can recognize the code in operation as a result of activation by the administrator. In this way, even in case the holographic barcode should become unreadable due to some trouble, the device can be made usable again without replacement in whole by replacement and mounting of only the holographic barcode.

When applied to such items as hotel room keys and coin lockers which are used by many persons, the level of security can be enhanced if the administrator is able to reactivate the link between such numbers as the room or locker number and the holographic barcode or the two-dimensional barcode.

The system may also be such that reactivation is performed by the user without mediation by the administrator. For example, there are many cases, such as with safety boxes and vaults installed in hotel rooms, lockers in such venues as sports facilities and umbrella stands in public facilities, in which it is convenient for only one person to be able to unlock during a certain period of use. At present, in such cases, physical keys are used or assigned code numbers are set. Each of these ways has a problem in use with the possibility of the item being lost, stolen or forgotten. Since the smartphone is one of the items that are most closely kept on a person, it is beneficial to be able to use the smartphone as such temporary keys.

An example of the application of the present invention in Configuration (C) for this purpose is described. First, in the unlocked state, when the user reads the holographic barcode using a dedicated application software with a smartphone, the unique individual ID information of the device and the unique individual ID information of the smartphone acquired from the holographic barcode itself, or from such processes as combination with a two-dimensional barcode printed in the vicinity, are sent to the authentication server and a link is made. After locking, when the user again reads the holographic barcode from the same smartphone, the lock is released if the data present at the time the link was made is matched.

As an example of the application of this configuration, it is possible to make it possible to activate remotely without actually reading the targeted holographic barcode. That is, the unique individual ID of a smartphone is acquired and rights to permit access to a unique individual ID determined by the holographic barcode or by such processes as combination with a two-dimensional barcode printed in the vicinity are granted to that smartphone. The unique individual ID of the smartphone may be checked and self-entered by the owner, processed by providing dedicated application software or, in order to further enhance the security, preferably processed by using a holographic barcode reader device for checking in. For example, when a client checking in at the front desk of a hotel registers a personal smartphone with a closed device such as in FIG. 17, or with a holographic barcode for registration in simple card form, the unique individual ID of the smartphone is read and linked to the unique individual ID described in the foregoing that is assigned to the key to the door of the specified room. Access rights can be granted and the lock may be set to permit release for a limited period of time.

In addition, it is also possible to transfer the key to a different smartphone from the one which was used for registration. That is, by making a link with a holographic barcode for registration and a first smartphone using the unique individual ID of the smartphone, next making a link with another holographic barcode and a second smartphone, and then linking together these links with the holographic barcodes in the authentication server, it is possible to release a lock with a smartphone that is different from the one which was used for registration. There is a great benefit in being able to register with a smartphone without using personal information such as name and telephone number.

As another example of the application of the present invention in Configuration (C), a system could be configured to verify that a certain smartphone was present at a certain time at the location where a holographic barcode with unique individual ID information was present. For example, by installing a holographic barcode of the present invention in such venues as in the vicinity of store entrances or cashiers, on restaurant tables, in facilities in tourist destinations and in railway stations, and having the user read holographic barcodes and accompanying information, application is possible to a system with which incentives can be received, such as points for visiting stores, coupons, service tickets, prize goods, prize money, special content, priority entry tickets to events and facilities and artists' handshake tickets. It is also possible to apply to so-called O-to-O (online to offline) programs to pull consumers from online, such as the internet, into offline, such as real storefronts. The expense may be borne by the operator, without fees charged to the commercial institutions, restaurants, tourist facilities or users, if objectives such as attracting customers are realized for the operator, and furthermore, business models are also possible in which, by carrying general advertisements, an advertiser bears part or all of the expense.

Although similar technologies to be adopted in such applications have been proposed, such as those utilizing near-field wireless communication technologies such as Bluetooth typified by iBeacon(copyright), those in which ultrasound is generated and received by a microphone of a smartphone for voice recognition, and those in which a non-contact IC is used for authentication, their implementation incurs great initial expense as specialized devices are required on the transmitting and/or receiving sides. There are also those in which the GPS function of the portable device is used, but these have also the disadvantage that they cannot be used in environments with poor GPS reception or environments where a plurality of check points should be located close to each other. A system using the present holographic barcode is able to provide a solution that is highly reliable even in such environments while keeping low the cost of introduction.

For example, a system can be configured in which holographic barcodes are placed at the features to be promoted in a demo vehicle in an automobile dealer, and customers are able to obtain some incentives, in addition to explanations about the features on the smartphone screen and by voice. This is not feasible with systems such as GPS, iBeacon and voice recognition alone. Linked operation may be made with such relatively wide area check-in functions to combine the technology of each. For example, notification of the existence of a secure check-in function by holographic barcode in the vicinity may prompt its use when a certain storefront is approached.

It is also possible to provide information with strong security by integration with augmented reality applications. An example of a see-through display in the form of glasses is shown in FIG. 19. Light sources 1, 2 and a small image sensor 3 are built into these glasses. A guiding mark is automatically shown in the see-through display when, by a two-dimensional printed code or other electronic watermark information placed in the vicinity, the presence of a holographic barcode is recognized. Since the positional relationship between the holographic barcode and the glasses is uniquely determined when the guiding mark is aligned with the holographic barcode or another marking that indicates the positional relationship, the present invention can be applied since the image detected by the image sensor upon illumination by light source 1, and next a second image upon illumination by light source 2, can be decoded.

By applying the present invention in Configuration (C) in locations where crowds gather and lines form, the functionality to obtain information, view advertisements or play games can be provided. For example, in venues where waiting lines form for entry to attractions in theme parks, to events, or to stores and restaurants, partition poles 201, flat belts 203 and ropes as shown in FIG. 20(a) are often used to marshal the lines. As shown in enlargement in FIG. 20(b), a holographic barcode 205 may also be placed on the top face of the belt housing 202 of this partition pole. The holographic barcode is incorporated under transparent reinforced glass to enhance durability and made to be non-removable. Since individual ID information is embedded, if the holographic barcode is activated for a limited period, various content can be provided only during the term of an event without changing the holographic barcode. Although this is possible also using an ordinary two-dimensional barcode, since presence at the venue is proven by using the holographic barcode, there is a benefit of providing a special incentive to the user and further enhancing the ability to attract customers, and there are many advantages for the operator such as the possibility also of advertising and provision of information to crowds in specific events or of utilization in the management of clientele. It is also possible to add a gaming element or special incentives by placing different holographic barcodes on a plurality of guide poles to set a number of points for check-in. Here, although an example has been described in which placement is on top of partition guide poles, if in a venue where waiting lines form, placement may be on the flat belts of partitions, or on separate guide display boards, counter platforms or walls. In the case of fixing on the top faces of guide poles, the face may be level, or more preferably slanted to be somewhat higher in the rear, with attachment of holographic barcodes of the type that is read from below. Further, in the case of attaching to flat belts or walls, it is preferable to attach holographic barcodes of the type that is read from above.

Although the foregoing description is premised on decoding barcodes with the presumption of machine reading, application is also possible to cases of converting such information as text information amenable to human reading into information data by OCR or image recognition.

The medium of the holographic barcode which has been described in the foregoing may be not only attached to base material with adhesive material but also formed as transferable film.

EXPLANATION OF THE NUMBERING

Figure 1:
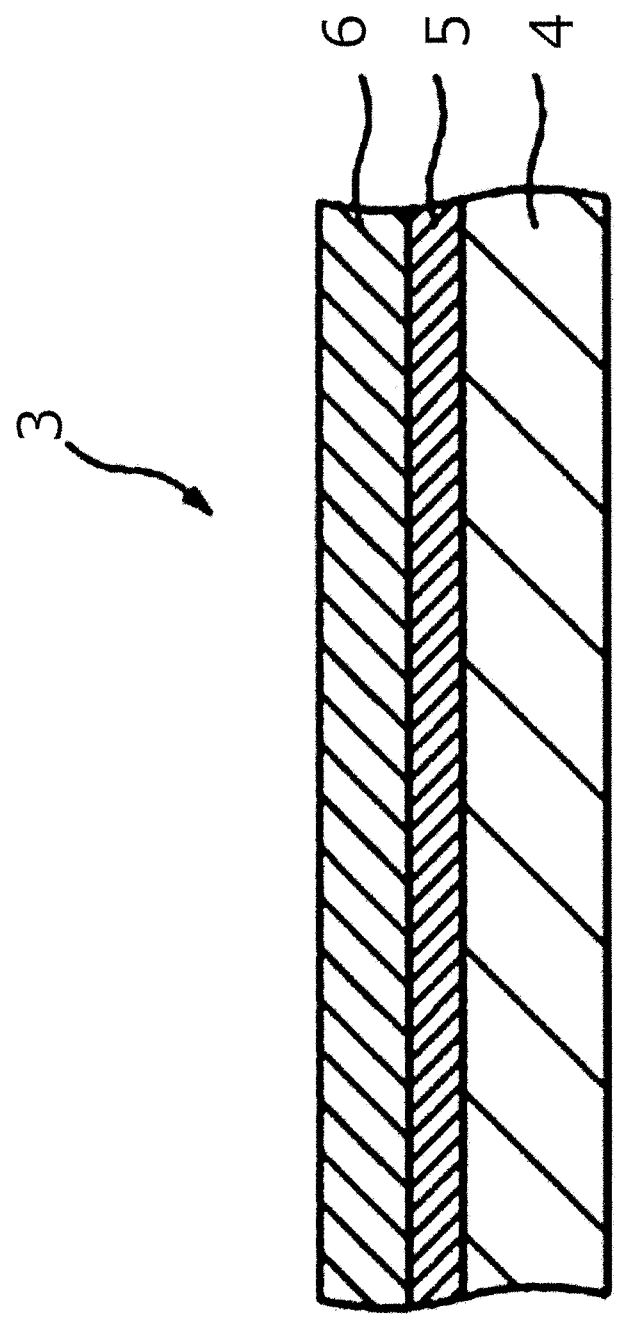
FIG. 1 Cross-sectional figure for explanation of the hologram recording material FIG. 2 Schematic figure for explanation of the exposure process of the hologram recording material FIG. 3 Figure for explanation of the overall configuration of the holographic stereogram production apparatus FIG. 4 Figure for explanation of the optical system of the holographic stereogram production apparatus FIG. 5 Figure showing the concept of the holographic stereogram FIG. 6 Figure showing a conventional example of a hologram reproduction device incorporating many LEDs FIG. 7 Figure showing a conventional example of a hologram reproduction device incorporating many LEDs FIG. 8 Figure showing the reproduced image seen from directly in front when illuminated by many LEDs FIG. 9 Figure showing an example of a hologram medium in which the present invention is applied FIG. 10 Figure showing an example of a hologram reproduction device in which the present invention is applied FIG. 11 Figure showing the conditions of reading of a holographic barcode in which the present invention is applied FIG. 12 Figure showing the conditions of reading of a holographic barcode in which the present invention is applied FIG. 13 Figure showing examples of hologram media in which the present invention is applied FIG. 14 Figure showing the reconstruction of a holographic barcode from partial captured data FIG. 15 Figure showing an example of a card to which a holographic barcode is attached FIG. 16 Figure showing an example of a device to facilitate reading of a holographic barcode FIG. 17 Figure showing an example of a box incorporating a holographic barcode FIG. 18 Figure showing an example of a flow chart for displaying guides on a portable information console FIG. 19 Figure showing an example of a see-through display in the form of glasses and incorporating a device for reading holographic barcodes FIG. 20 Figure showing an example of a partition guide pole incorporating a device for reading holographic barcodes
Figure 2:
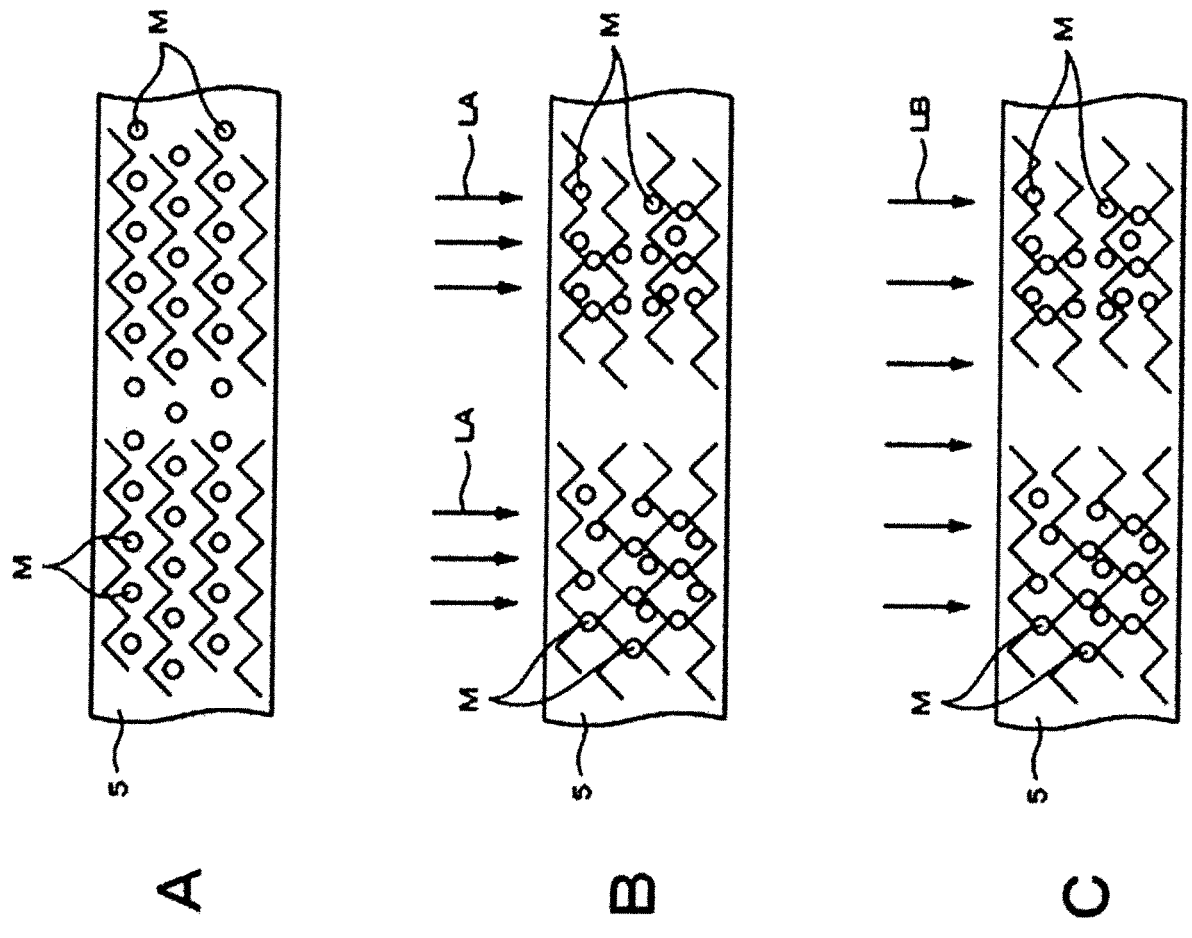
Figure 3:
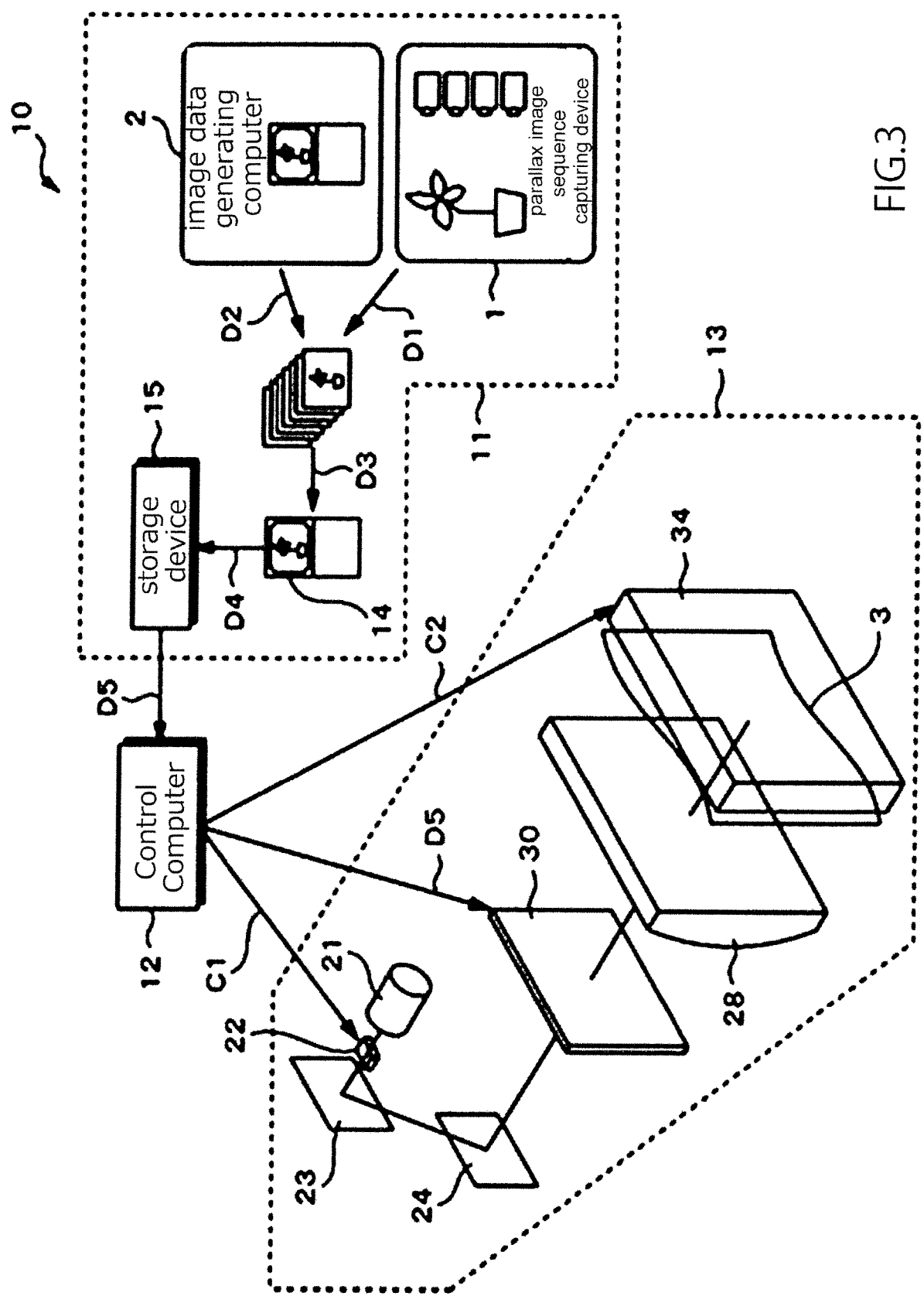
Figure 5:
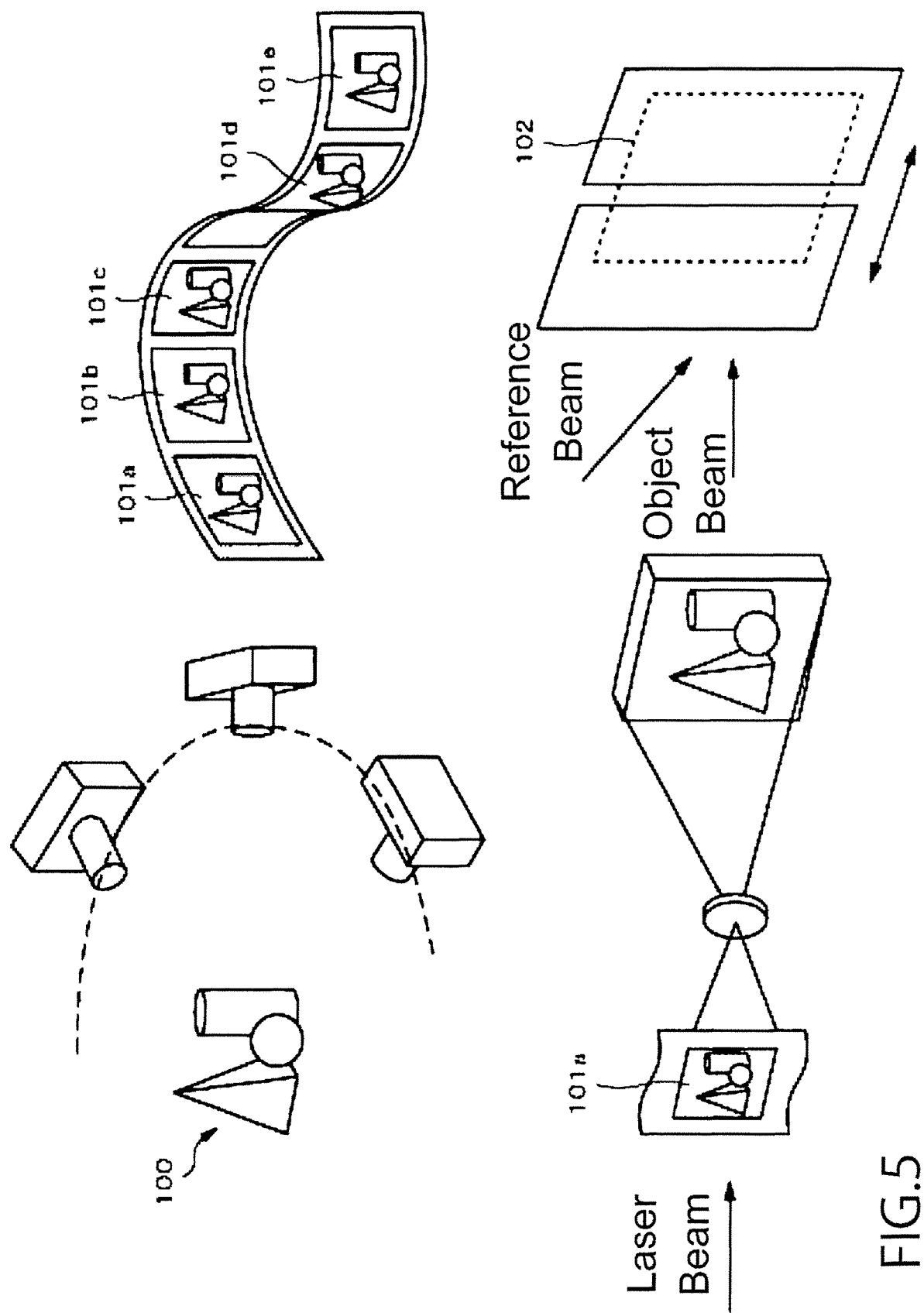
Figure 6:
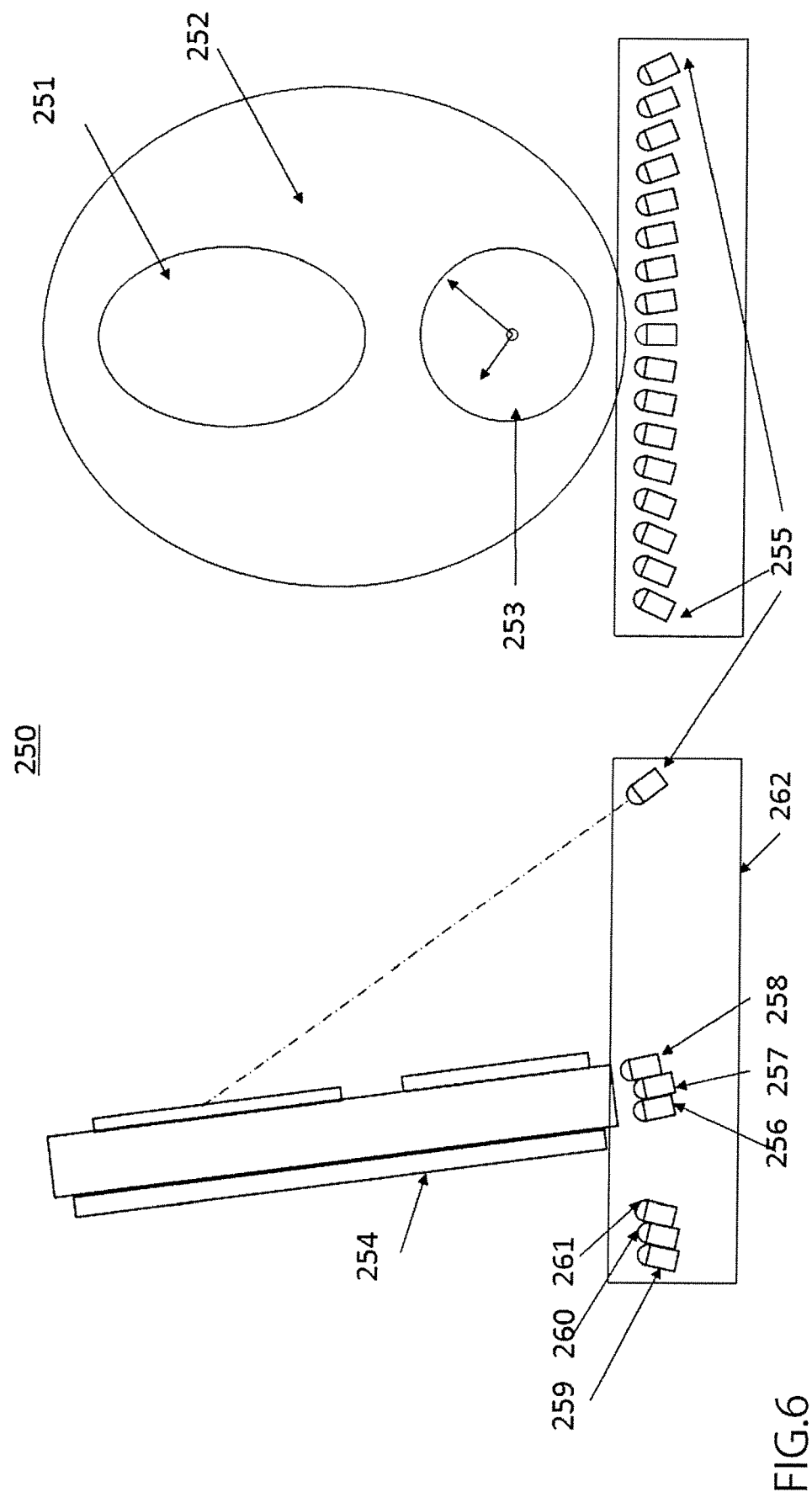
Figure 7:
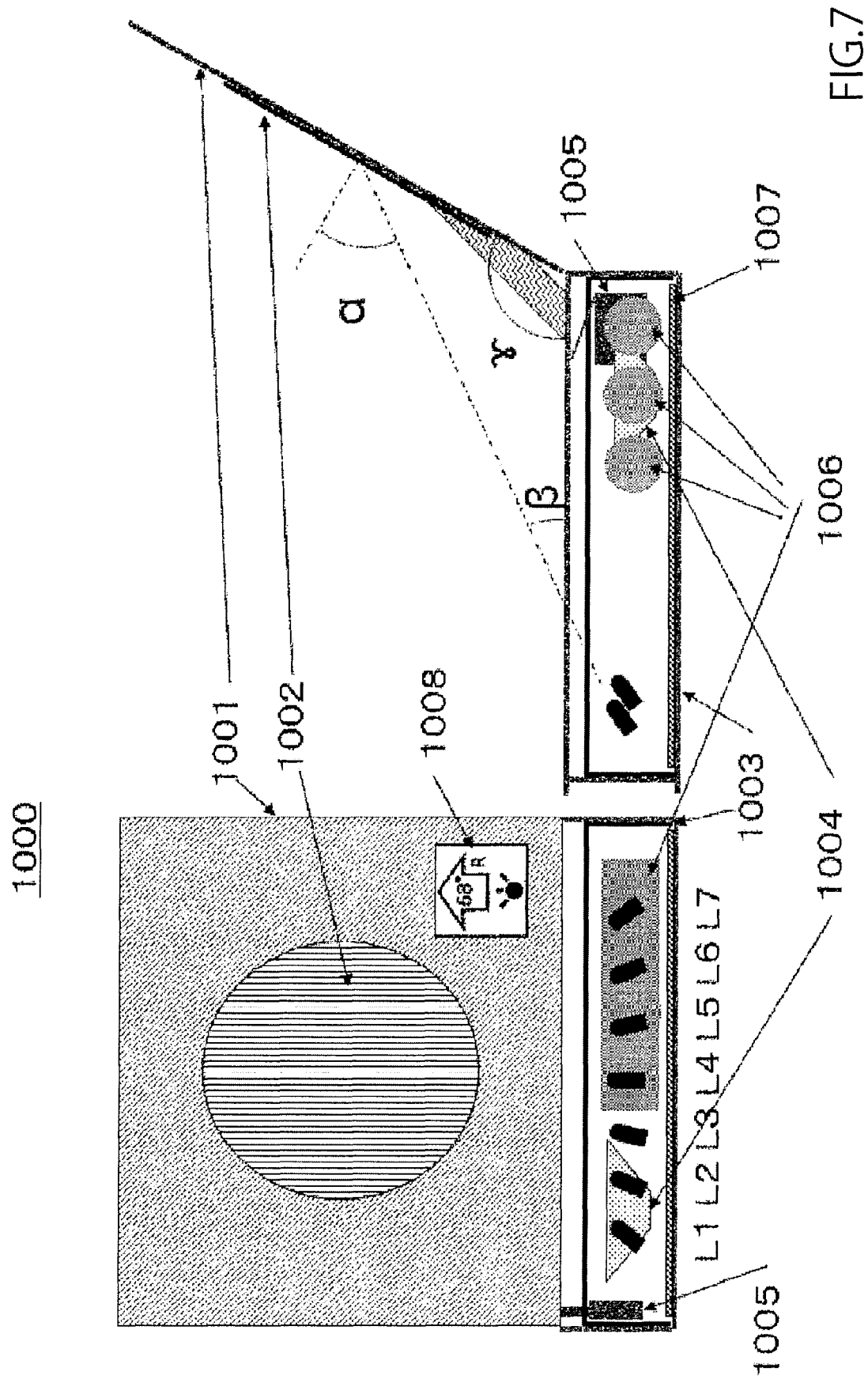
Figure 8:
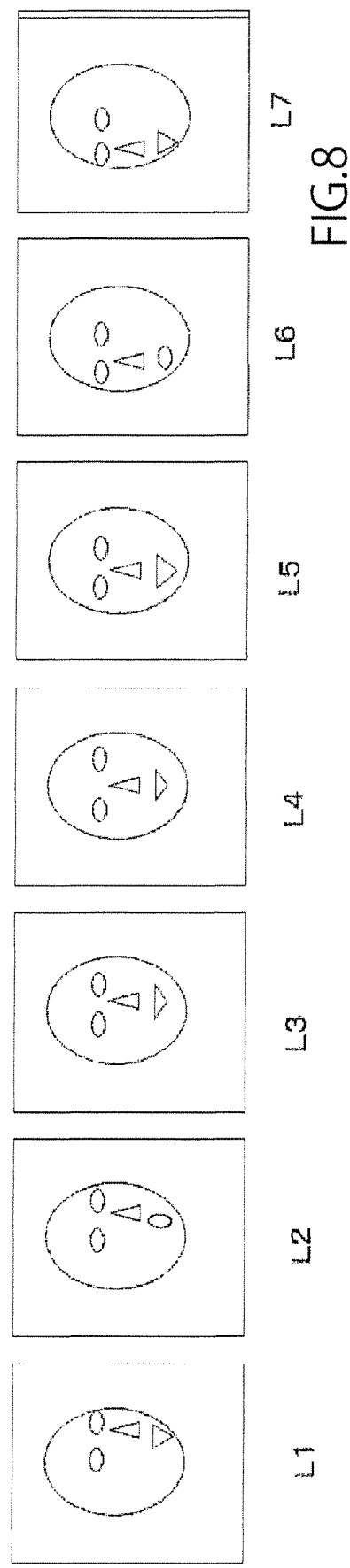
Figure 9:
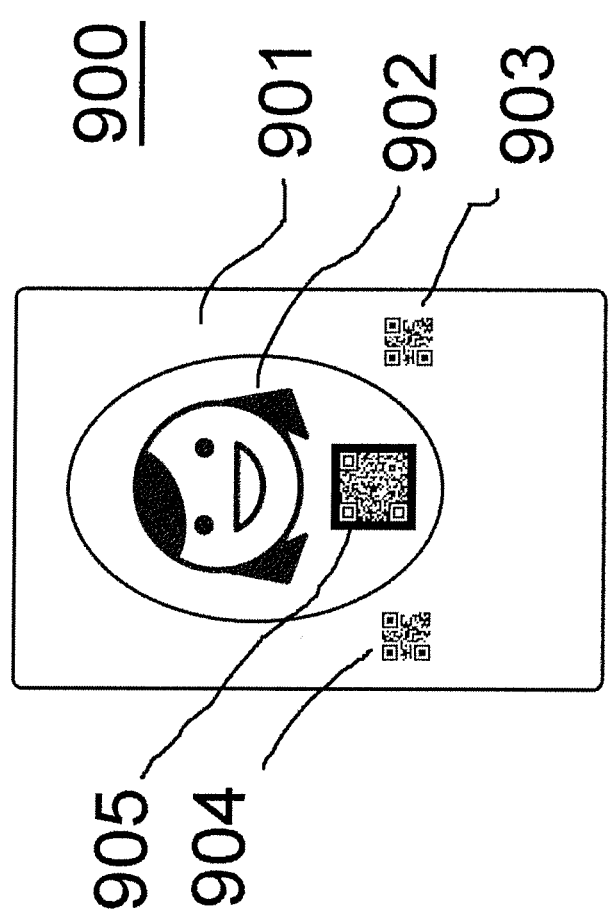
Figure 10:
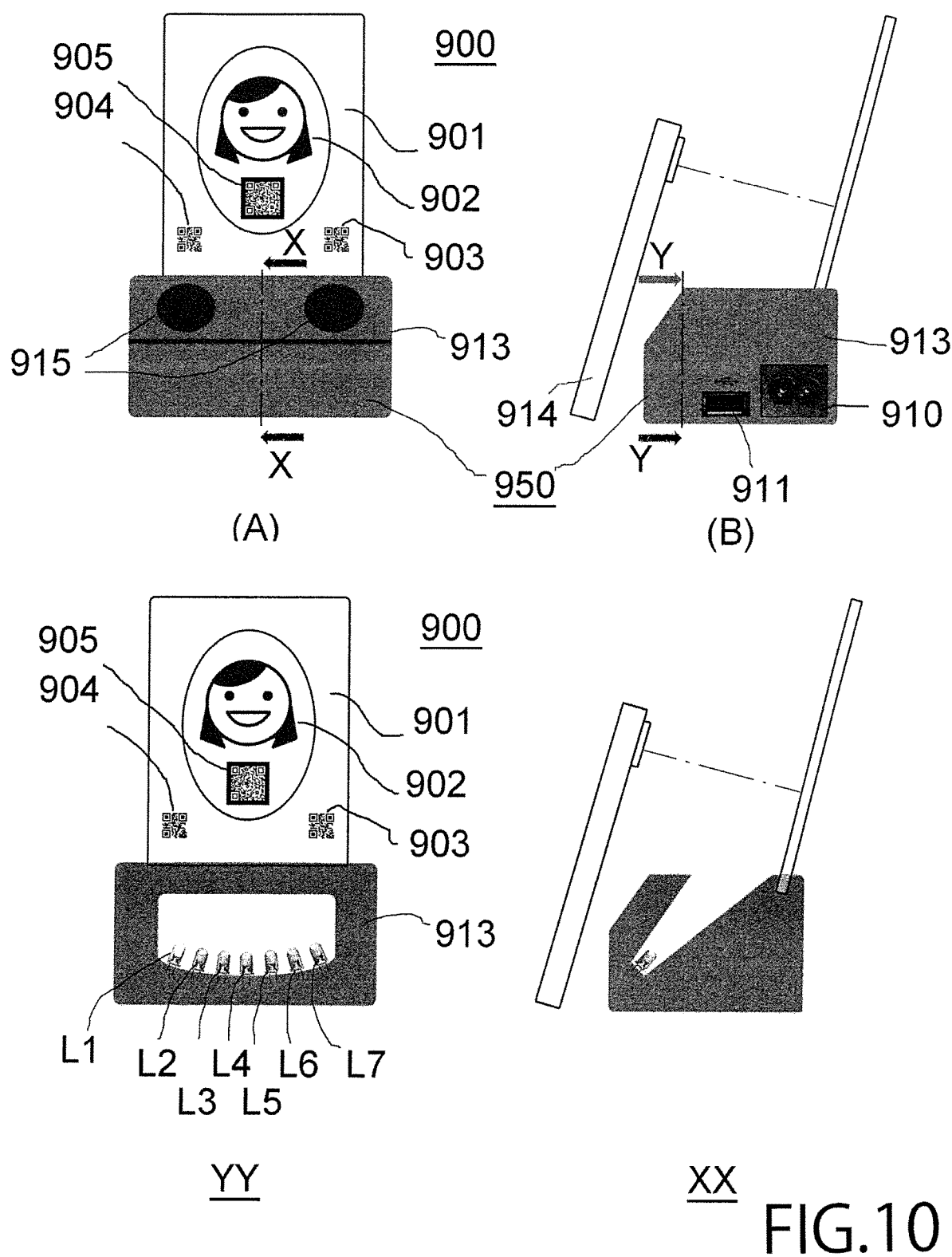
Figure 11:
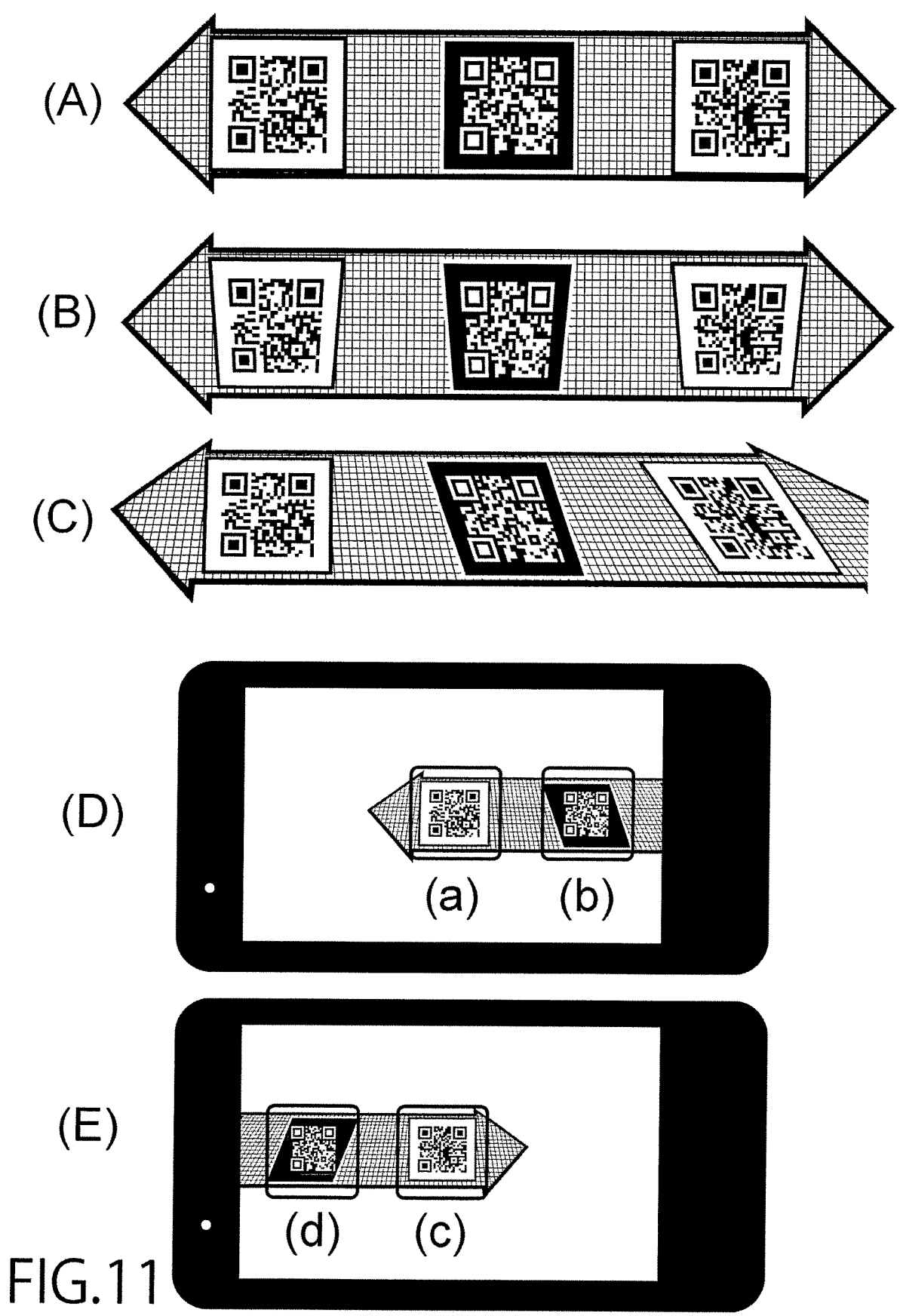
Figure 13:
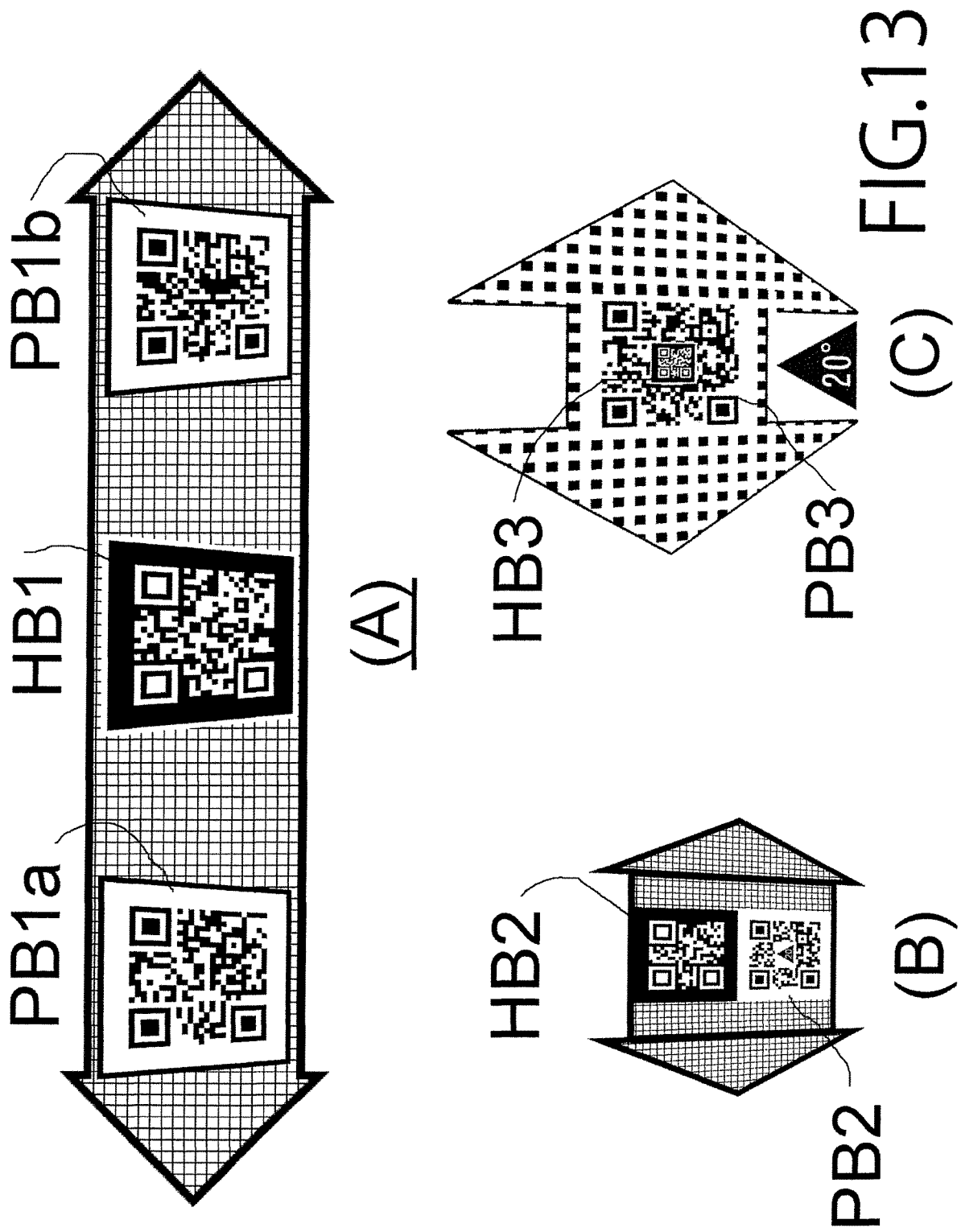
Figure 15:
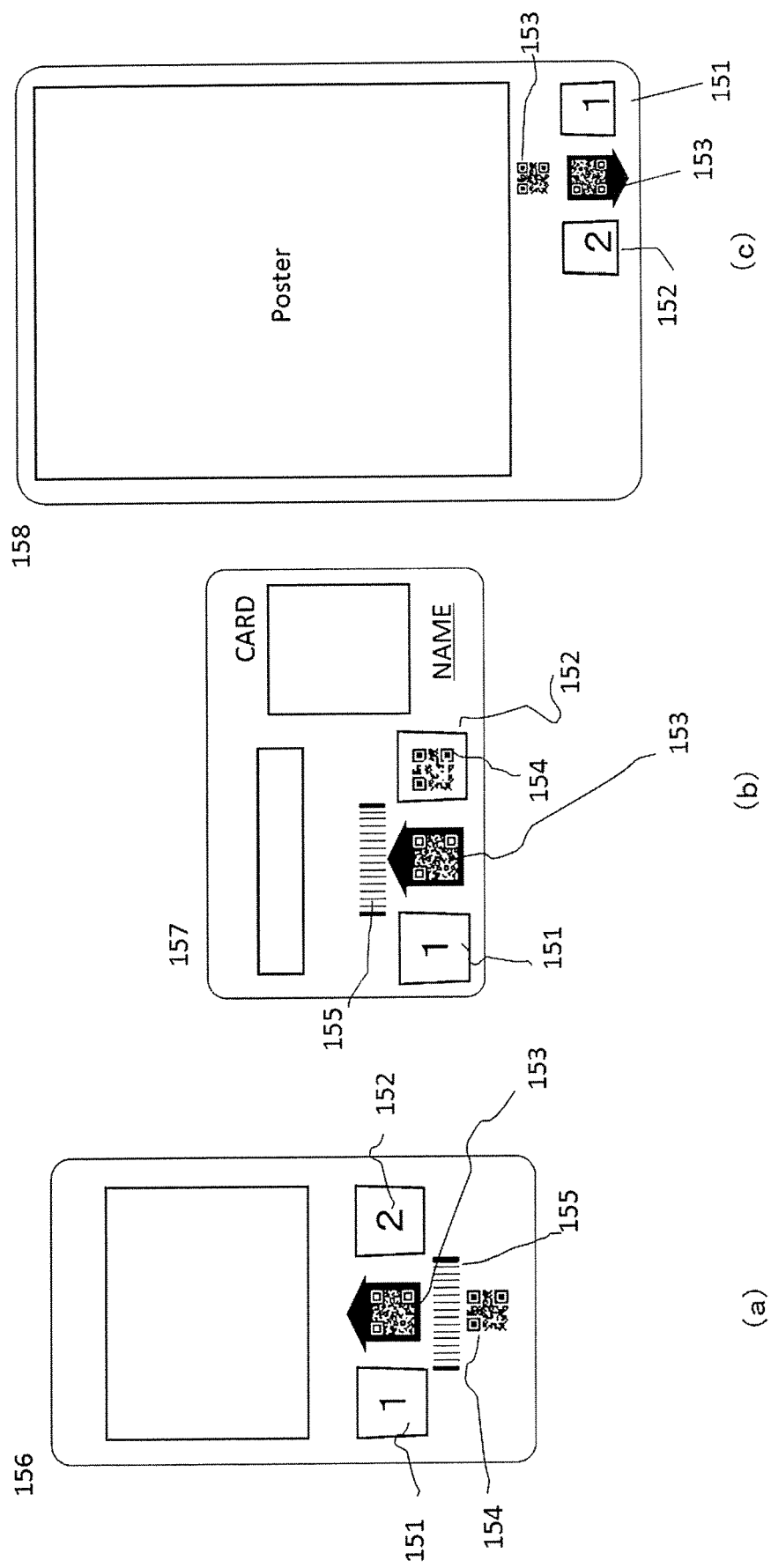
Figure 16:
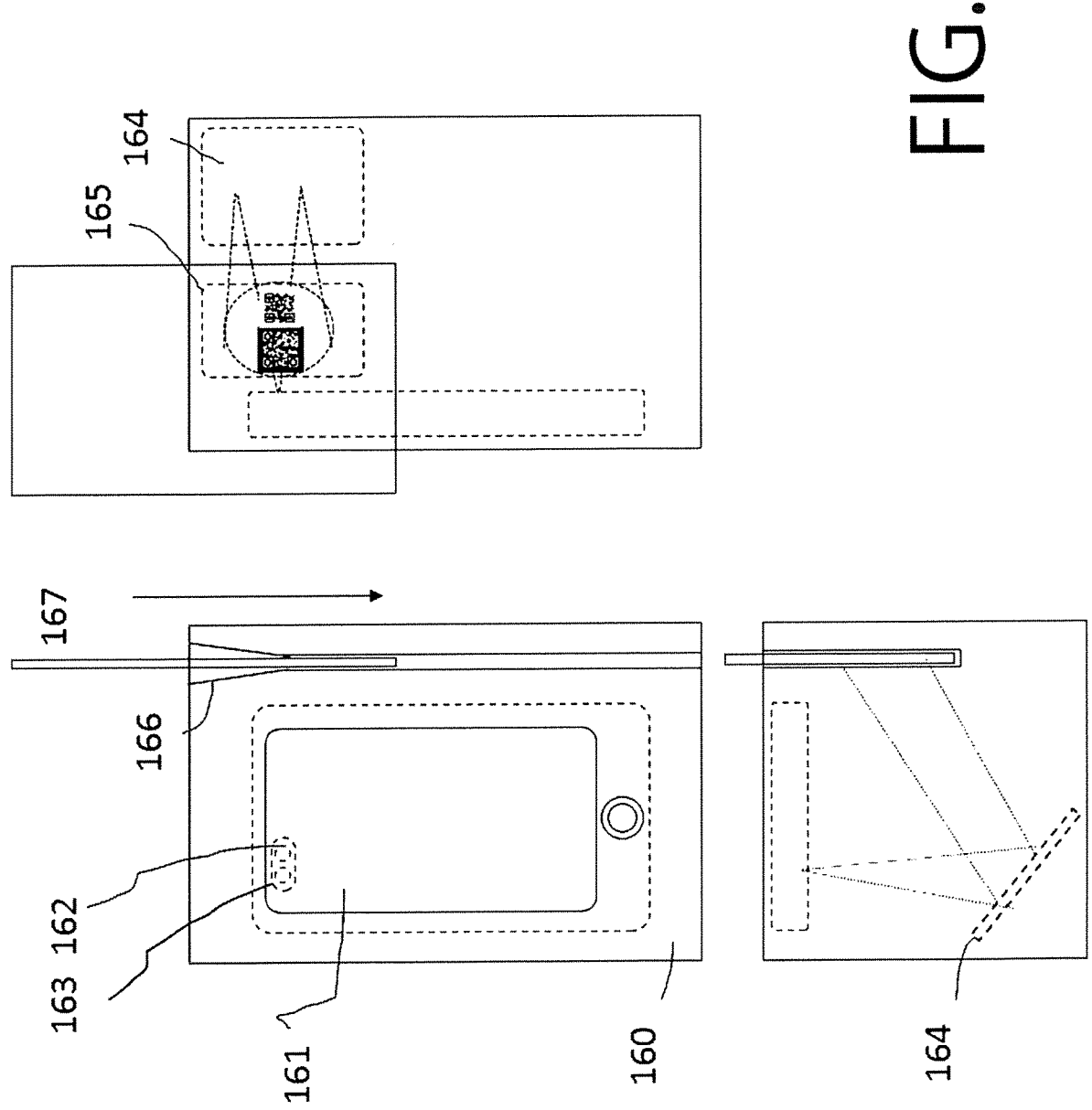
Figure 17:
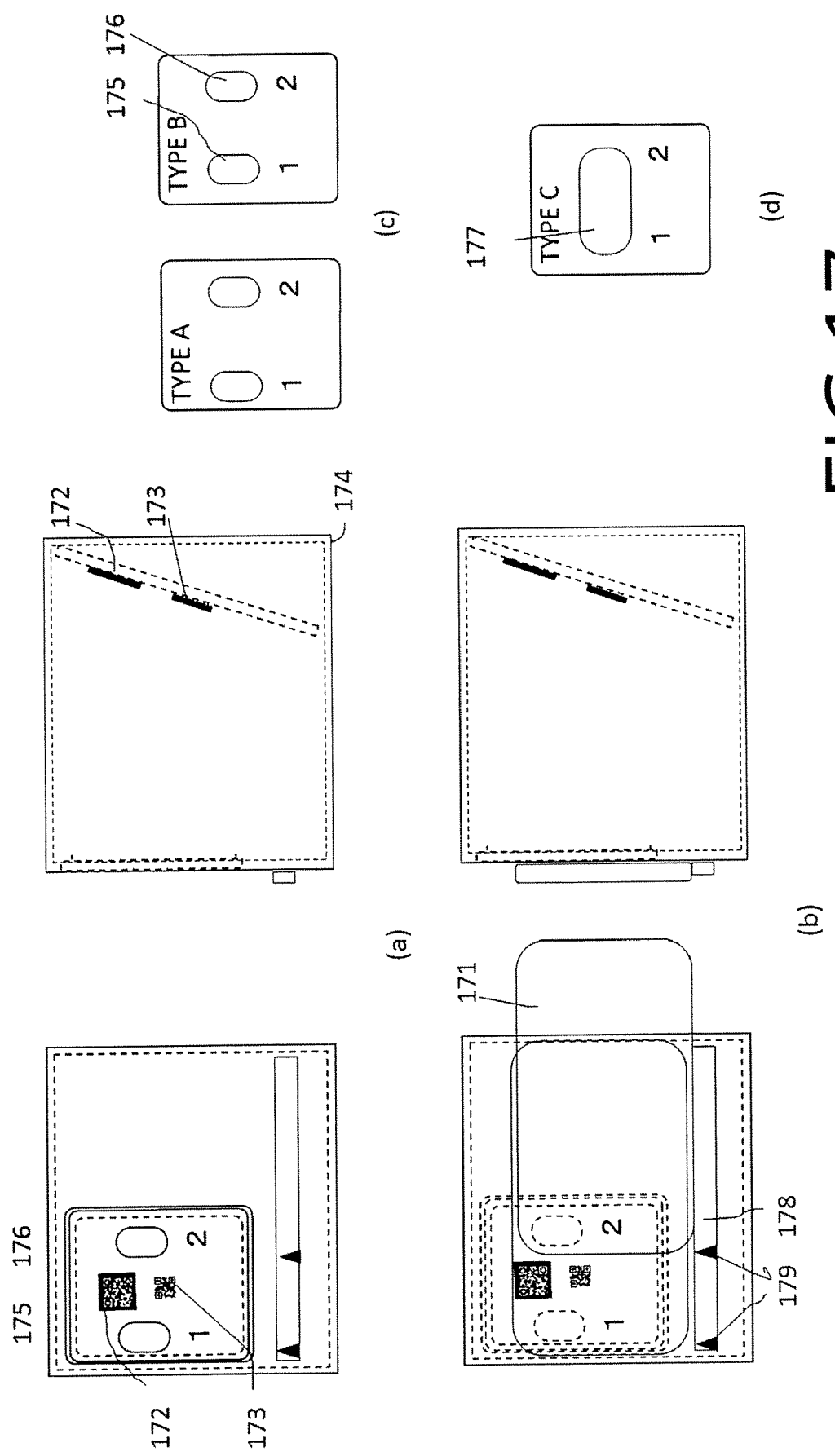
Figure 18:
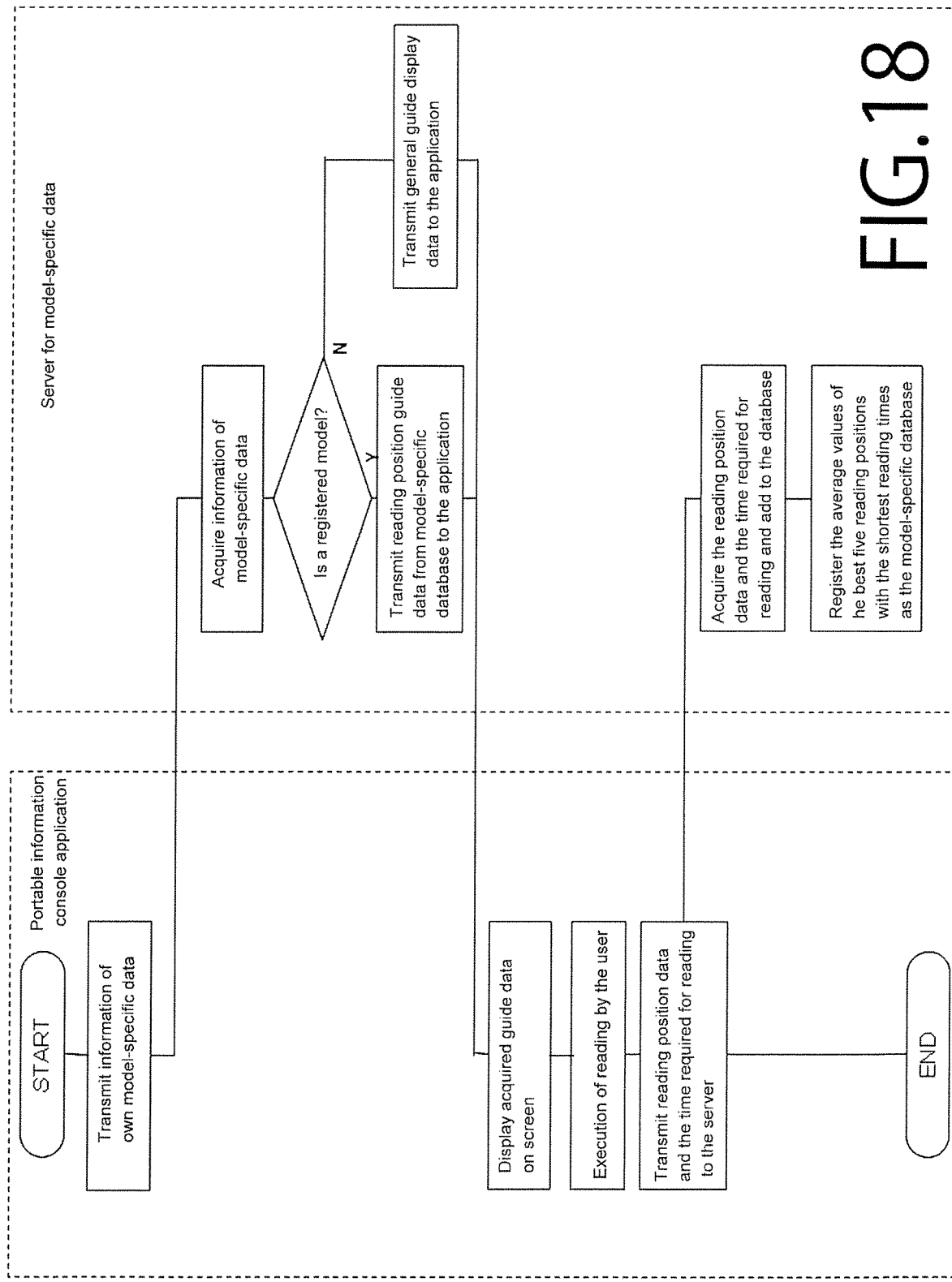
Figure 19:
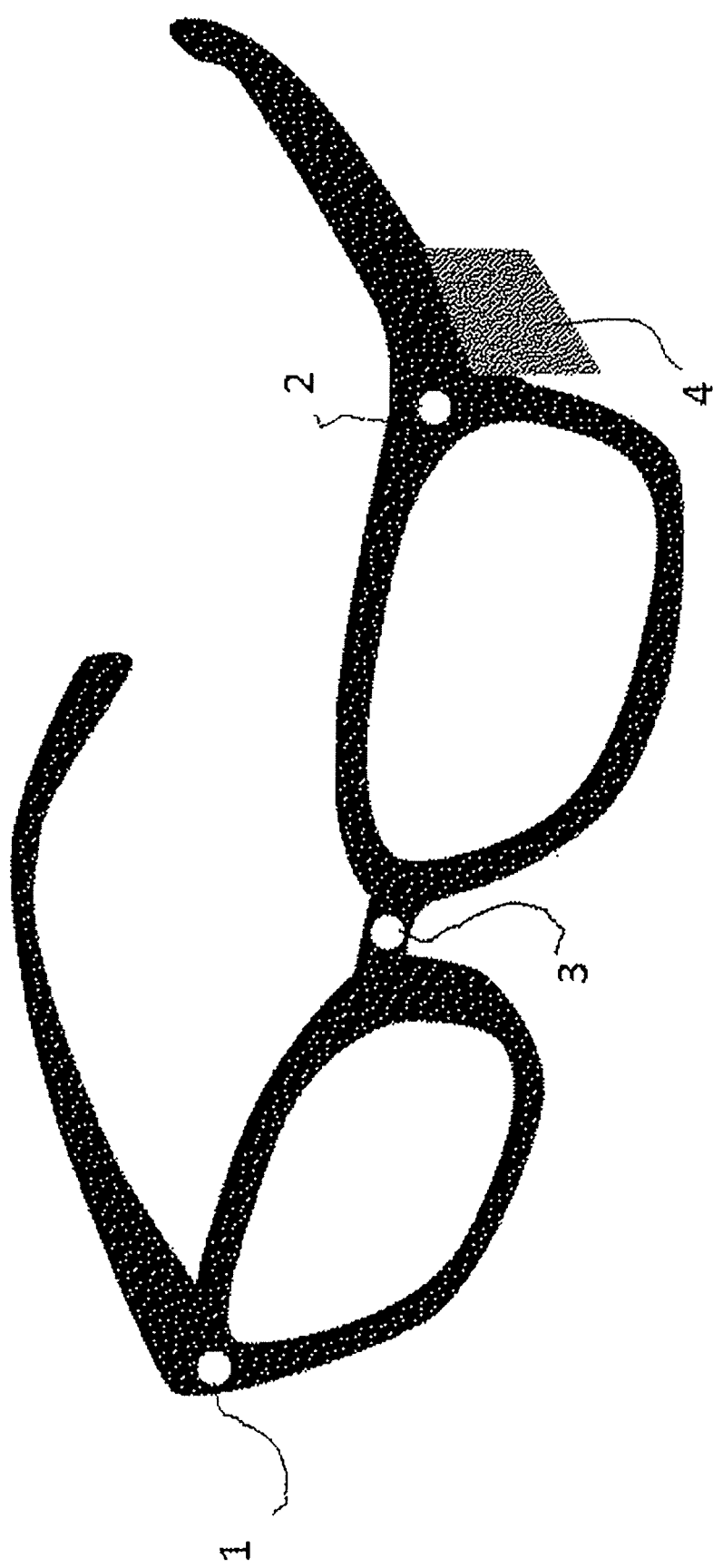

3: hologram recording medium
4: base film
5: photopolymer layer
10: holographic stereogram production apparatus
900: medium
901: card-shaped support
902: hologram
903, 904: two-dimensionally printed barcode
905: holographic barcode
910: AC inlet
911: USB connector
913: platform
914: smartphone
915: speaker
L1-L7: LED light sources
HB1, HB2, HB3: holographic barcodes
PB1a, PB1b, PB2, PB3: two-dimensionally printed barcodes
955: battery housing
960: bracket
965: switch
969: desk
980: movable light-source penlight
981: sliding rail
982: sliding unit
L1-L7 light sources
LX1, LX2: LEDs

What is claimed is:

1. A method of image recognition using a hologram and an information processing device incorporating both a light source and an image sensor, comprising:
a procedure in which at least two conditions are created,
by moving the integrated information processing device relative to the hologram with the light source and image sensor fixed in a condition in which neither their relative positions nor their relative angles are adjustable, and/or,
by changing only the mode of lighting without movement of the information processing device and the hologram relative to each other,
a procedure of acquiring image information in the said different conditions by the said information processing device using the image sensor, and
a procedure to compare the said information with information representing the features of the medium to be recognized that is acquired by a different procedure.

2. A method of image recognition described in claim 1, further comprising:
incorporation of a means of communication in the said information processing device,
a procedure for transmitting to and receiving from a device that is different from the said information processing device the acquired image information and/or the information representing the features of the medium to be recognized, and
a procedure for performing different actions according to the said result.

3. An image recognition method according to claim 1, in acquiring the information recorded in the said hologram, further comprising:
a procedure to read information placed in the vicinity of the said hologram that is recorded by a method other than that of the hologram.

4. A method of image recognition according to claim 1, further comprising:
a procedure to link the unique individual ID information of the information processing device incorporating an image sensor, together with the said image information.

5. A method of image recognition according to claim 1, further comprising:
a procedure for making the information processing device to be in the sensing state in which, using a hologram medium on which one or more image codes for authentication are holographically printed, it receives and decodes the hologram medium at a specified sampling interval,
a procedure for making the light source to be in a first mode of lighting, a procedure for verifying that the holographically recorded barcode is successfully decoded during the first mode of lighting,
a procedure for making the light source to be in a second mode of lighting, and
a procedure for verifying that the holographically recorded barcode is successfully decoded during the second mode of lighting.

6. A method of image recognition according to claim 1, further comprising:
a procedure for making the information processing device to be in a condition for, using a hologram medium on which holograms are printed from which one or more different image codes for authentication are reproduced, capturing with fixed focus using an image capturing device that is roughly still,
a procedure for making different light sources to be lighted, and
a procedure for using for judgment of authenticity the ability to read the corresponding image code information for authentication within a specified period of time.

7. A method of image recognition according to claim 1, further comprising:
a procedure for using a medium in which an encrypted image code for authentication is holographically recorded and creating at least two conditions with different positional relationships among the illuminating light, the said medium and the image sensor,
a procedure to regenerate a single image code for authentication by reconstructing partial areas that are captured, and
a procedure to decode the said regenerated image code for authentication.

8. A method of image recognition according to claim 1, further comprising:
a procedure for, in an information processing device incorporating a light source and an image sensor that is a portable information console, acquiring the values detected by at least one among acceleration sensors and gyrosensors incorporated in the portable information console, and a procedure to utilize for image analysis the acquired detected values.

9. A method of image recognition according to claim 1, further comprising:

a procedure for using an information processing device incorporating an image sensor that has a means of communication with a remote server to transmit to, and receive from, the server information such as information about the control of lighting of the hologram reproduction device, the captured images, the content of decoded data and the time required for decoding.

10. A method of image recognition according to claim 1, further comprising:

a procedure for reading, as a marking image formed on the hologram medium, the face of the hologram or in its vicinity on the base material by printing or working by a non-holographic method, information which enables the determination of the position or angular direction of a hologram medium, a procedure for predicting the position of the hologram medium from the information acquired from the said marking image, and a procedure for capturing or decoding the hologram image by restricting the zone based on the said predicted information.

11. A method of image recognition according to claim 1, further comprising:

a procedure for an information processing device to decode a barcode which constitutes a marking that is printed by two-dimensional printing, a procedure for fixing the focus upon completion of decoding, and a procedure to then capture the hologram image.

12. A method of image recognition according to claim 1, further comprising:

a procedure for, in an information processing device incorporating an image sensor, a light source and a display device, displaying the image captured by the image sensor in real time, a procedure for lighting the light source, a procedure for displaying a first guiding mark on the display device, a procedure for prompt alignment of the guiding mark on the display device with a first marking image displayed on the hologram medium, on the face of the hologram or in its vicinity on the base material by printing or working by a non-holographic method, a procedure for displaying a second guiding mark on the display device after the first hologram information has been read, and a procedure to prompt its alignment with a second marking image on the face of the hologram or in the vicinity on the base material.

13. A method of image recognition according to claim 12, further comprising:

a procedure for, in an information processing device incorporating an image sensor, a light source and a display device, transmitting the data about the model type of the information processing device to a storage device, a procedure for acquiring from the said storage device data about the position of the guide marking to be displayed on the display device, and a procedure for displaying on the display device according to the acquired data.

14. A method of image recognition according to claim 12, further comprising:

a procedure for transmitting to the said storage device the image of the holographic barcode on the image sensor when a holographic barcode is successfully decoded, or the information of parameters such as position and angle that are acquired therefrom, a procedure for displaying a first guiding mark on the display device, a procedure to prompt alignment of the guiding mark on the display device with a first marking image displayed on the hologram medium, on the face of the hologram or in its vicinity on the base material by printing or working by a non-holographic method, a procedure for displaying a second guiding mark on the display device after the first hologram information has been read, and a procedure to prompt its alignment with a second marking image on the face of the hologram or in the vicinity on the base material.

15. A non-transient storage medium encoded with instructions for performing a method of image recognition using a hologram and an information processing device incorporating both a light source and an image sensor, the instructions when executed by a computer causing the computer to perform a procedure in which at least two conditions are created by changing only the mode of lighting without movement of the information processing device and the hologram relative to each other, a procedure of acquiring image information in the said different conditions by the said information processing device using the image sensor, and a procedure to compare the said information with information representing the features of the medium to be recognized that is acquired by a different procedure.

16. A non-transient storage medium encoded with instructions for performing a method of image recognition using a hologram and an information processing device incorporating both a light source and an image sensor, the instructions being executable after a procedure in which at least two conditions are created by moving the integrated information processing device relative to the hologram with the light source and image sensor fixed in a condition in which neither their relative positions nor their relative angles are adjustable, the instructions when executed by a computer causing the computer to perform a procedure of acquiring image information in the said different conditions by the said information processing device using the image sensor, and a procedure to compare the said information with information representing the features of the medium to be recognized that is acquired by a different procedure.

* * * * *